us009675084B2

(12) United States Patent
Mikkelsen et al.

(10) Patent No.: US 9,675,084 B2
(45) Date of Patent: Jun. 13, 2017

(54) PREVENTION OF EXTRACT DARKENING AND MALODOR FORMATION DURING SOLUBILIZATION OF PLANT CELL WALL MATERIAL

(75) Inventors: René Mikkelsen, Skanderborg (DE); Jens Frisbæk Sørensen, Arhus N (DE)

(73) Assignee: DuPont Nutrition Biosciences ApS, Copenhagen (DK)

( * ) Notice: Subject to any disclaimer, the term of this patent is extended or adjusted under 35 U.S.C. 154(b) by 0 days.

(21) Appl. No.: 13/259,475

(22) PCT Filed: Mar. 29, 2010

(86) PCT No.: PCT/EP2010/054104
§ 371 (c)(1),
(2), (4) Date: Sep. 23, 2011

(87) PCT Pub. No.: WO2010/115754
PCT Pub. Date: Oct. 14, 2010

(65) Prior Publication Data
US 2012/0034343 A1    Feb. 9, 2012

Related U.S. Application Data

(60) Provisional application No. 61/165,195, filed on Mar. 31, 2009.

(30) Foreign Application Priority Data

Mar. 31, 2009    (EP) .................................... 09156890

(51) Int. Cl.
C12N 9/02    (2006.01)
A23K 1/00    (2006.01)
(Continued)

(52) U.S. Cl.
CPC ............... *A21D 8/042* (2013.01); *A21D 2/36* (2013.01); *A21D 13/02* (2013.01); *A23L 7/104* (2016.08);
(Continued)

(58) Field of Classification Search
CPC ............ A23K 1/00; A23L 1/105; C07C 31/08
(Continued)

(56) References Cited

U.S. PATENT DOCUMENTS 4,758,515 A * 7/1988 Barwald et al. ................ 435/99
2004/0018256 A1    1/2004 Dreese et al.
(Continued)

FOREIGN PATENT DOCUMENTS

EP    0 468 731 A1    1/1992
EP    1 785 192 A1    5/2007
(Continued)

OTHER PUBLICATIONS

Schooneveld-Bergmans, M. E. F. et al. 1998. Extraction and partial characterization of feruloylated glucuronoarabinoxylans from wheat bran. Carbohydrate Polymers. 35: 39-47.*
Chen, O. et al. 2007. Biosynthesis of phytosterol esters: Identification of a sterol O-acyltransferase in Arabidopsis. Plant Physiology, 145: 974-984.*
Plamarola-Adrados, B. 2005. Ethanol production from non-starch carbohydrates of wheat bran. Biores. Technol., 96: 843-850.*
(Continued)

*Primary Examiner* — Hamid R Badr
(74) *Attorney, Agent, or Firm* — DuPont Nutrition Biosciences ApS

(57) ABSTRACT

Methods are provided for reducing color and/or unpleasant taste and/or malodor development in a composition comprising a plant material, such a cereal bran, in particular during solubilization processes of the plant material. Optimized solubilization methods are provided, wherein color and/or unpleasant taste and/or malodor development is controlled. Solubilized plant material, kit of parts, the use of such solubilized plant material, e.g. in food products or bioethanol are also provided.

10 Claims, 6 Drawing Sheets

Figure 1:
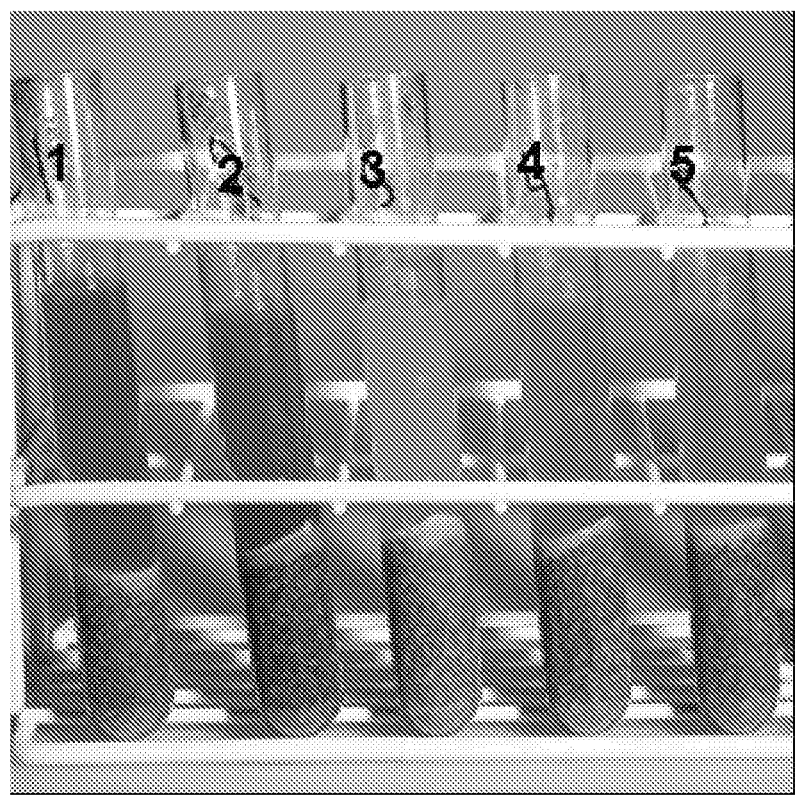

(51) Int. Cl.
A23L 1/105 (2006.01)
C07C 31/08 (2006.01)
A21D 8/04 (2006.01)
A21D 2/36 (2006.01)
A21D 13/02 (2006.01)
C11B 3/00 (2006.01)
C12F 3/10 (2006.01)
A23L 7/104 (2016.01)

(52) U.S. Cl.
CPC .............. *A23L 7/107* (2016.08); *C11B 3/003* (2013.01); *C12F 3/10* (2013.01)

(58) Field of Classification Search
USPC ...... 426/52, 618, 623, 61; 568/840; 435/189
See application file for complete search history.

(56) References Cited

U.S. PATENT DOCUMENTS

2004/0033291 A1 2/2004 Burgermeister et al.
2006/0078648 A1 4/2006 De Kreij et al.

FOREIGN PATENT DOCUMENTS

| GB | EP0818960 | * | 1/1998 |
| JP | 04-145516 | | 12/1993 |
| JP | 6-284852 A | | 10/1994 |
| WO | WO 01/21012 A1 | | 3/2001 |
| WO | WO 02/067698 A1 | | 9/2002 |
| WO | WO 2004/064537 A2 | | 8/2004 |
| WO | WO 2007/036795 | | 4/2007 |
| WO | WO 2008/000050 A2 | | 1/2008 |
| WO | WO 2008/087167 A2 | | 7/2008 |

OTHER PUBLICATIONS

Beuchat, Larry R., *Food and Beverage Mycology*, 2nd edition, 1987, Springer, retrieved from the Internet on Feb. 6, 2009: URL:http://books.google.de/books?id=vMpVKtRLht4C&hl=en >, p. 484.

Cloetens, L., et al., "Dose-Response Effect of Arabinoxylooligosaccharides on Gastrointestinal Motility and on Colonic Bacterial Metabolism in Healthy Volunteers," *Journal of the American College of Nutrition*, 2008, vol. 27(4), pp. 512-518.

Coe, Mayne, R., "Photochemical Studies of Rancidity: The Mechanism of Rancidification,"*Journal of American Oil Chemists' Society*, 1938, vol. 15, pp. 230-236.

Courtin, C., et al., "Effects of dietary inclusion of xylooligosaccharides, arabonoxylooligosaccharides and soluble arabinoxylan on the microbial composition of caecal contents of chickens," *Journal of the Science of Food and Agriculture*, 2008, vol. 88, pp. 2517-2522.

Ramezanzadeh, F., et al., "Prevention of Oxidative Rancidity in Rice Bran during Storage," *Journal of Agricultural and Food Chemistry*, 1999, vol. 47(8), pp. 2997-3000.

Swennen, K., et al., "Large-scale production and characterization of wheat bran arabinoxylooligosaccharides," *Journal of the Science of Food and Agriculture*, 2006, vol. 86, pp. 1722-1731.

Mujahid, A, et al., "Effect of various processing techniques and different levels of antioxidant on stability of rice bran during storage," *Journal of the Science of Food and Agriculture*, 2005, vol. 85:847-852.

Poutanen, K., "Enzymes: An important tool in the improvement of the quality of cereal foods," *Trends in Food Science & Technology*, 1997, pp. 300-306, XP055158799, Retrieved from the Internet: URL:http://www.sciencedirect.com/science/article/pii/S0924224497010637.

Communication from European Patent Office for European Patent Application No. 10711822 dated Dec. 22, 2014.

* cited by examiner

PREVENTION OF EXTRACT DARKENING AND MALODOR FORMATION DURING SOLUBILIZATION OF PLANT CELL WALL MATERIAL

CROSS-REFERENCE TO RELATED APPLICATIONS

This application is the U.S. National Stage of International Application PCT/EP2010/054104 filed Mar. 29, 2010, which designates the U.S and was published by the International Bureau in English on Oct. 14, 2010, and which claims the benefit of European Patent Application No. 09156890.7, filed Mar. 31, 2009, and U.S. Provisional Application No. 61/165,195, filed Mar. 31, 2009, all of which are hereby incorporated herein in their entirety by reference.

FIELD OF THE INVENTION

The present invention relates to methods for reducing color and/or unpleasant taste and/or malodor development in a composition comprising at plant material, such a ceral bran, in particular during solubilization processes of the plant material. The invention further relates to optimised methods of solubilization, wherein color and/or unpleasant taste and/or malodor development is controlled. Solubilised plant material, kit of parts, the use of such solubilised plant material, e.g. in food products or bioethanol are also encompassed by the present invention.

BACKGROUND OF THE INVENTION

Utilization of sidestreams from processing of plant materials or fermentation residues, such as cereal bran from milling or Distillers dried spent grain with solubles (DDGS) has received little attention beyond use in animal feeds.

Most of the prior art describes the use of enzymes in flour and in dough and not for sidestreams or by-products of industrial processes.

It has recently been shown by e.g. Courtin et. al Journal of the science of food and agriculture. 88. p 2517-2522 (2008) and by Cloetens et al, Journal of the American College of Nutrition, Vol. 27, No. 4, 512-518 (2008), that the solubilised bran has a better nutritional effect than the insoluble bran in chickens.

Swennen et al. Journal of the science of food and agriculture, 2006, vol. 86, 1722-1731, relates to large-scale production and characterisation of wheat bran arabinoxylooligosaccharides.

WO2008000050 relates to methods for making soluble arabinoxylans as co-product of fermentation of whole-grain cereals.

WO2008087167 relates to methods for increasing the level of water-soluble arabinoxylan oligosaccharides in situ in baked products.

Prevention of oxidative degradation of food and feed products is very important for the preservation of the quality of the products. Oxidation processes in the products can lead to changes in color, flavour, aroma or other organoleptic unacceptable changes. Furthermore, oxidation may cause damage to essential amino acids and result in the loss of vitamins. In particular, food products containing polyunsaturated fatty acids are susceptible to oxidation, potentially resulting in rancid food products.

An oxidation reaction occurs when a food molecule, e.g. a fatty acid, combines with oxygen in the presence of free radicals; trace metals, such as Fe and Cu; or reactive oxygen species, such as singlet oxygen, peroxides or hydroperoxide. Antioxidants have commenly been used to suppress these reactions. Examples of generally utilized antioxidants are butylhydroxyanisole (BHA) and butylhydroxytoluene (BHT), which are mostly used in foods that are high in fats and oils, as well as sulfites, which are used primarily as antioxidants to prevent or reduce discoloration of fruits and vegetables. However, BHA and BHT may not be safe for human health and sulfites are known to destroy vitamin B. For these reasons, biological or natural antioxidants, such as, tocopherol (Vitamin E), L-ascorbic acid, citric acid, melanoidin, flavonoids and gallic acid are generally preferred. Chelating agents such as EDTA, siderohores (iron chelating agents from microorganisms), citric acid and lactobionic acid have also been used to address problems with oxidation due to their ability to prevent trace metals from provoking oxidation.

There is a need in the art for better methods for reducing oxidation processes, in particular for the utilisation of side-streams from processing of plant materials, such as cereal bran from milling, soap stocks from refining of vegetable oils, Distillers dried spent grain with solubles (DDGS), wherein less of the plant material will go to low price applications like cattle feed. Furthermore, it is a long felt need to be able to utilise the bran fraction from cereals in traditionally, already existing cereal products, without significant impact on the product appearance/structure, the color or the taste, and to make it possible to increase the health and nutritional effect of already exisiting products.

OBJECT OF THE INVENTION

It is an object of embodiments of the invention to provide methods for controlling oxidation processes in plant material, in general and from industrial side-streams in particular. It is furthermore an object of the present invention to provide suitable methods enabling the utilisation of cereal bran in food products, such as in bread or cereal products, without significant impact on the product appearance/structure, the color or the taste, and to make it possible to increase the health and nutritional effect of already existing products.

SUMMARY OF THE INVENTION

It has been found by the present inventor(s) that by controlling the oxidation processes of in plant material, a reduction in color and/or unpleasant taste and/or malodor development may be accomplished.

So, in a broad aspect the present invention relates to a method for reducing development of improper sensoric properties, such as development of bad taste, such as less bitterness, smell, color apperance in a composition comprising plant material, wherein the method comprises one or more step of controlling the oxidation processes of the plant material.

In a first aspect the present invention relates to a method for reducing color and/or unpleasant taste and/or malodor development in a composition comprising plant material, wherein the method comprises one or more step of controlling the oxidation processes of the plant material.

In a second aspect the present invention relates to a method for reducing color and/or unpleasant taste and/or malodor development in a composition comprising at least partly solubilised plant material, the method comprising one or more step of controlling the oxidation processes of said plant material.

In a third aspect the present invention relates to a method of solubilization of a composition comprising plant material, the method comprising a step of controlling the oxidation processes of said plant material.

In a third aspect the present invention relates to a solubilised cereal bran produced by a method of solubilization of a composition comprising plant material, the method comprising a step of controlling the oxidation processes of said plant material.

In a further aspect the present invention relates to the use of a solubilised cereal bran, produced by a method of solubilization of a composition comprising plant material, the method comprising a step of controlling the oxidation processes of said plant material, for the production of a food product.

In a further aspect the present invention relates to a food product obtained by the use of a solubilised cereal bran, produced by a method of solubilization of a composition comprising plant material, the method comprising a step of controlling the oxidation processes of said plant material, for the production of the food product.

In a further aspect the present invention relates to the use of a solubilised cereal bran, produced by a method of solubilization of a composition comprising plant material, the method comprising a step of controlling the oxidation processes of said plant material, for the production of bio-ethanol, as well as bioethanol produced from this use.

In a further aspect the present invention relates to a kit of parts comprising i) one or more compound selected from: an oxido-reductase enzyme; an antioxidant; a lipid modifying enzyme;

ii) instructions for use in a method according to the invention; and optionally iii) one or more further compound as defined in the present patent application.

In a further aspect the present invention relates to a kit of parts comprising i) one or more compound selected from: an oxido-reductase enzyme; an antioxidant; a lipid modifying enzyme;

ii) a combination of enzymes comprising: one or more cell-wall modifying enzyme; one or more starch modifying enzyme, and optionally one or more further enzyme;

iii) instructions for use in a method according to the present invention; and optionally iv) one or more other ingredient for a food product.

LEGENDS TO THE FIGURE

FIG. 1: Color development of samples with preboiling of the bran suspension after 24 hrs of incubation. 1: Blank; 2: Cell wall and starch modifying enzymes; 3: Cell wall and starch modifying enzymes+ascorbic acid; 4: Cell wall and starch modifying enzymes+glucose oxidase; 5: Cell wall and starch modifying enzymes+glucose oxidase and catalase.

Figure 2:
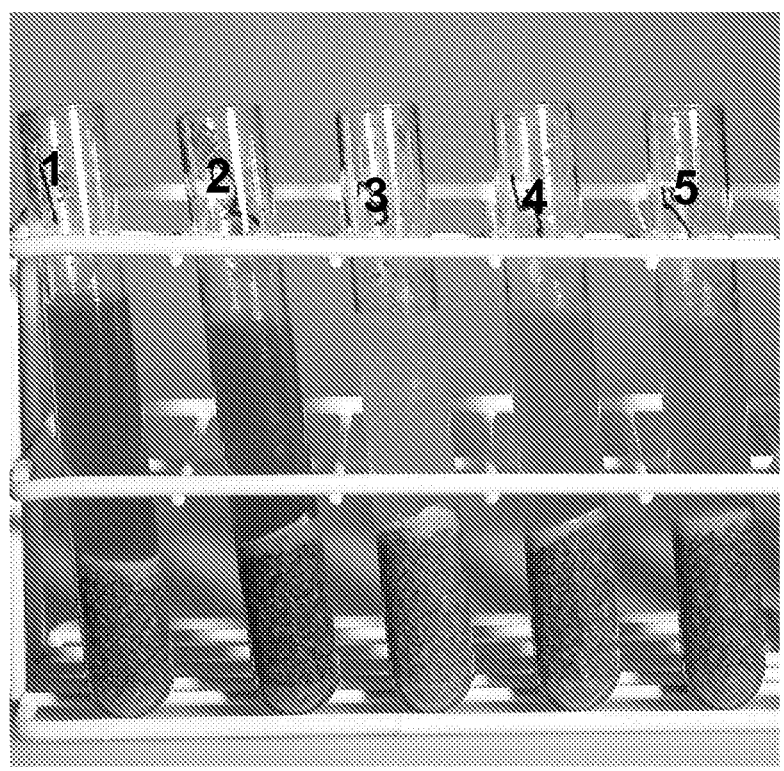

FIG. 2: Color development of samples after 6 hrs without initial preboiling of the bran suspension. 1: Blank; 2: Cell wall and starch modifying enzymes; 3: Cell wall and starch modifying enzymes+ascorbic acid; 4: Cell wall and starch modifying enzymes+glucose oxidase; 5: Cell wall and starch modifying enzymes+glucose oxidase and catalase.

Figure 3:
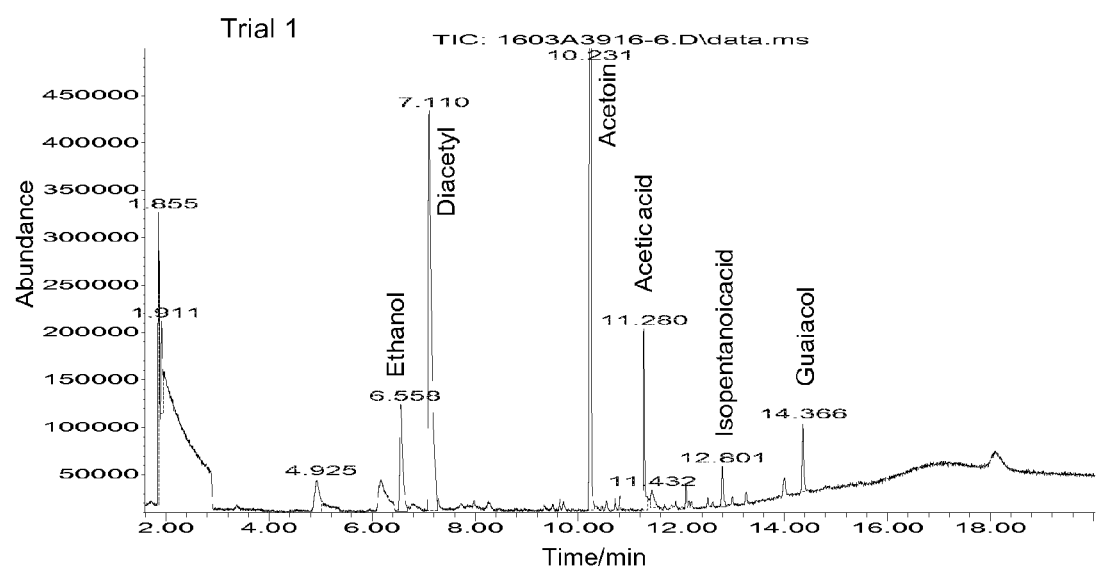
Figure 3:
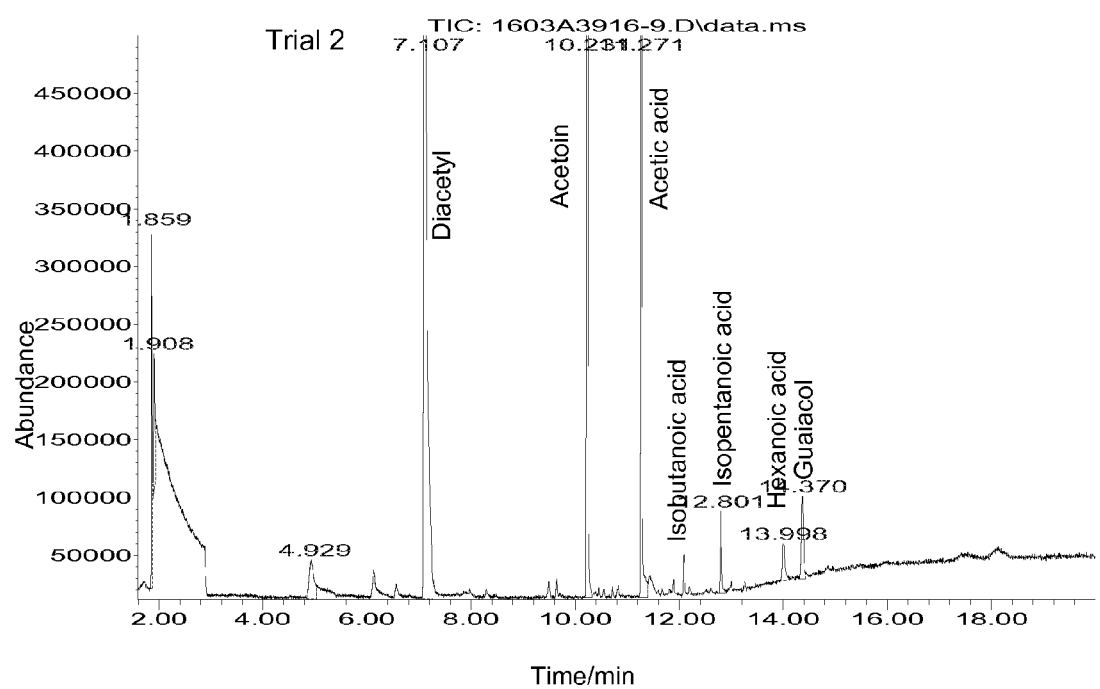
Figure 3:
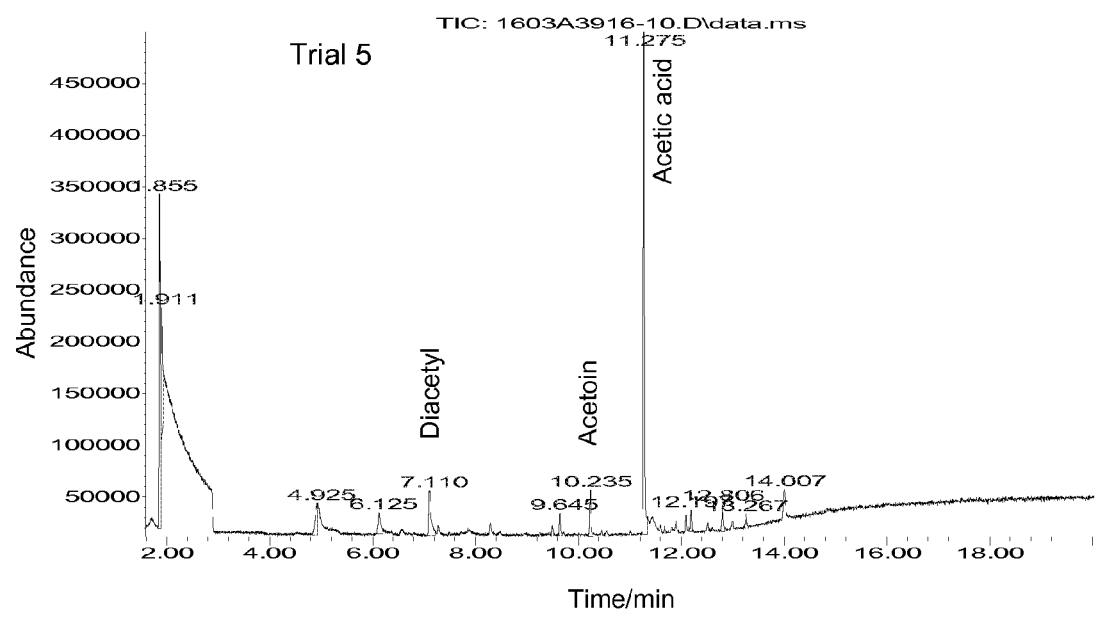

FIG. 3. Headspace analysis of volatiles from example 2. Trial 1: Blank; Trial 2: Cell wall and starch modifying enzymes; Trial 5: Cell wall and starch modifying enzymes+glucose oxidase and catalase.

Figure 4:
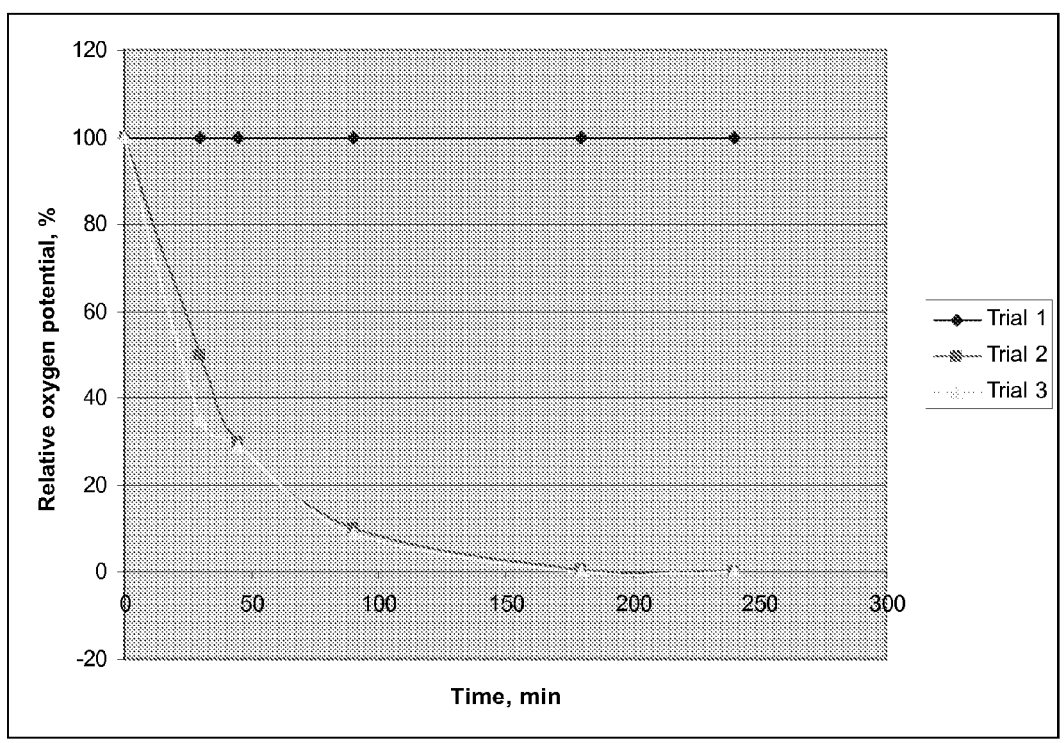

FIG. 4. Development in oxygen potential over time. Trial 1, Cell wall and starch modifying enzymes. Trial 2, Cell wall and starch modifying enzymes+Glucose oxidase. Trial 3, Cell wall and starch modifying enzymes+Glucose oxidase+catalase.

DETAILED DISCLOSURE OF THE INVENTION

The inventors of the present patent application have during enzymatic solubilization of bran observed a significant darkening of the generated soluble extract as well as a formation of malodors. These are significant obstacles for the commercialization of the solubilization process in particular for the utilization in food products. Surprisingly we have found that treatment with an oxidoreductase enzyme such as glucose oxidase (GOX) and/or addition of antioxidants such as ascorbic acid eliminates darkening of the soluble extract caused by oxidation processes and lowers the oxygen potential. This will all reduce malodors resulting from oxidation of endogenous compounds. In some aspects of the invention the treatment to control oxidation processes and to lower the oxygen potential may be done simultaneous with a process for solubilization, such as in solubilization of bran.

Several problems are associated with increasing the extraction yield in milling, the functional performance of a resulting flour is effected by increasing the extraction yield.

Another problem of increasing the extraction yield or adding more of a bran material to cereal application is changes in sensoric characteristics. By modifying the bran fraction according to the present invention, it is possible to modify the sensoric characteristics of a resulting flour, giving a less bitter and more palatable sensoric characteristica.

The technology may be applicable to most cereal applications like baking, breakfast cereals, pasta etc.

DEFINITIONS

The phrase "controlling the oxidation processes" as used herein refers to the use of any method or condition, wherein the oxidation of compounds within the plant material is modified. The oxidation of compounds may be modified by an overall reduction of oxidation processes. Alternatively, oxidation of compounds may be modified by having particular compounds oxidized for avoiding the oxidation of other compounds.

The term "color development" refers to the development over time of an increased absorption of any light within the visible spectrum in the at least partly solubilised plant material. The color development is measured after the removal of insoluble components, such as removal by sedimentation or centrifugation. Color development may be measured by vision or by any other suitable spectrophotometric methods.

The term "malodor development" refers to the development over time of an increased smell as evaluated objectively by an average human being. The increased smell may be in terms of both intensity (strength) and/or quality (degree of offensiveness). Malodor may be measured by any suitable method know to the person skilled in the art, such as GC-SNIF or CHARM analysis.

The term "unpleasant taste development" as used herein refers to the development over time of an increased human perception of unpleasant, sharp, or disagreeable such as bitter taste as evaluated objectively by an average human being.

The term "antioxidant" as used herein refers to any compound capable of slowing down or preventing the oxidation of other molecules by being oxidized themselves. The term includes, but are not limited to, ascorbic acid, fatty acid esters of ascorbic acid, N-acetylcysteine, benzyl isothiocyanate, beta-carotene, chlorogenic acid, citric acid, 2,6-di-tert-butylphenol, lactic acid, tartaric acid, uric acid, sodium ascorbate, calcium ascorbate, sodium phosphates (such as monosodium phosphate, disodium phosphate, trisodium phosphate), potassium phosphates (such as monopotassium phosphate, dipotassium phosphate, tripotassium phosphate), lecithin, potassium ascorbate, rosemary extract, green tea extract, black tea extract, tocopherols such as tocopherols (vitamin E), such as mixed tocopherols, α-tocopherol (any stereoisomer or any mix thereof), β-tocopherol, γ-tocopherol, δ-tocopherol, vitamin K, butylated hydroxytoluene (BHT), butylated hydroxyanisol (BHA), erythorbin acid, anoxomer antioxidants, erythorbic acid, sodium erythorbate, sodium erythorbin, ethoxyquin, glyceryl mono-oleate, catalase, gum guaiac, malic acid, propyl gallate, octyl gallate, dodecyl gallate, ethyl gallate, tertiary butylhydroquinone (TBHQ), ascorbyl stearate, ascorbyl palmitate, glutathione, citric acid esters of mono- and diglycerides of fatty acids, thiodipropionic acid, or tannic acid or combinations thereof. In a preferred embodiment the antioxidant used according to the invention is a food-grade antioxidant. In some embodiments the antioxidant is exogenous to the composition being treated. However, antioxidants may also be added to compositions having low amounts of same endogenous antioxidant to increase overall effective amounts.

In some embodiments the antioxidants is an enzyme such as catalase, superoxide dismutase and various peroxidases.

The antioxidant may be used in an amount which is effective to reduce the oxygen potential, the amount may be in the range 50-50000 ppm, preferably in the range 75-25000 ppm and more preferable 100-10000 ppm.

The antioxidant may be used in an amount which is effective to reduce the oxygen potential, the amount may be in the range 0.005-5% (w/w), preferably in the range 0.008-2.5% (w/w) and more preferable 0.01-1% (w/w).

The term "oxidoreductase" as used herein refers to any enzyme capable of catalyzing the transfer of electrons from one molecule to another. In some embodiments, the oxidoreductase used according to the invention is capable of reacting with a sugar as a substrate. The oxidoreductase may be an oxidase or a dehydrogenase capable of reacting with an electron donor as a substrate such as carbohydrates e.g. glucose, or maltose.

The oxidase may be any suitable oxidase of the group E.C. 1.1.3.x. The oxidase may be a glucose oxidase, a pyranose oxidase, a hexose oxidase, glycerol oxidase, pyranose oxidase (EC 1.1.3.10), a galactose oxidase (EC 1.1.3.9) or a carbohydrate oxidase which has a higher activity on maltose than on glucose. The glucose oxidase (EC 1.1.3.4) may be derived from *Aspergillus niger*, e.g., having the amino acid sequence described in U.S. Pat. No. 5,094,951. The hexose oxidase (EC 1.1.3.5) may be derived from algal species such as *Iridophycus flaccidum, Chondrus crispus* and *Euthora cristata*. The pyranose oxidase may be derived from *Basidiomycete* fungi, *Peniophora gigantean, Aphyllophorales, Phanerochaete chrysosporium, Polyporus pinsitus, Bierkandera adusta* or *Phlebiopsis gigantean*. The carbohydrate oxidase which has a higher activity on maltose than on glucose may be derived from *Microdochium* or *Acremonium*, e.g., from *M. nivale* (U.S. Pat. No. 6,165,761), *A. strictum, A. fusidioides* or *A. potronii*.

WO 96/39851 discloses the use of a hexose oxidase which is capable of oxidizing D-glucose and several other reducing sugars including maltose, lactose, galactose, xylose, arabinose and cellobiose to their respective lactones with a subsequent hydrolysis to the respective aldobionic acids.

The dehydrogenase may be glucose dehydrogenase (EC 1.1.1.47, EC 1.1.99.10), galactose dehydrogenase (EC 1.1.1.48), D-aldohexose dehydrogenase (EC 1.1.1.118, EC 1.1.1.119), cellobiose dehydrogenase (EC 1.1.5.1, e.g., from *Humicola insolens*), fructose dehydrogenase (EC 1.1.99.11, EC 1.1.1.124, EC 1.1.99.11), aldehyde dehydrogenase (EC 1.2.1.3, EC 1.2.1.4, EC 1.2.1.5). Another example is glucose-fructose oxidoreductase (EC 1.1.99.28).

The oxidoreductase may be used in an amount which is effective to reduce the amount of odor and/or color producing oxidized compounds in the final product. For glucose oxidase, the amount may be in the range 50-20,000 (e.g., 100-10,000 or 1,000-5,000) GODU/kg dry matter in the raw material. One GODU is the amount of enzyme which forms 1 micromole of hydrogen peroxide per minute at 30° C., pH 5.6 (acetate buffer) with glucose 16.2 g/l (90 mM) as substrate using 20 min. incubation time. For other enzymes, the dosage may be found similarly by analyzing with the appropriate substrate.

The term "lipid-containing plant material" as used herein refers to any plant material, such as a cereal bran that comprises significant amounts of material derived from a plant that contain endogenous amounts of lipids. Suitably the plant material may be obtained in high amounts, contain significant amount of lipids and may be used in industrial processes.

In some embodiments the lipid-containing plant material is a side-stream, or by-products of industrial processes. In some embodiments the plant material may also contain non-plant material such as a by-product from a fermentation, that may contain yeast cells.

In some particular embodiments the lipid-containing plant material is a cereal bran, such as e.g. wheat bran from traditional milling.

In some embodiments an amount of at least about 100 mg, such as at least about 200 mg, such as at least about 300 mg per 100 g dry weight of the lipid-containing material is phospholipid.

In some embodiments an amount of at least about 10 mg, such as at least about 20 mg, such as at least about 30 mg per 100 g dry weight of the lipid-containing plant material is phosphatidylinositol (PI).

The phrase "partly solubilised lipid-containing plant material" as used herein refers to plant material, which contain lipids and which have been solubilised at least partly by enzymatic or mechanical action.

The term "plant material" as used herein refers to any species belonging to the biological kingdom plantae. In some other embodiments, the plant material is fruits. In some particular embodiments, the plant material is suitable for human or animal consumption. In other embodiments, the plant material is suitable for industrial utilisation, such as food product preparation or for the production of bioethanol. Preferably the plant material is cereal bran.

The term "cereal" as used herein refers to the fruits from a plant of the family *Poaceae*, such seed containing at least the bran comprising the aleurone, and the starchy endosperm, with or without the additional presence of pericarp, seed coat (alternatively called testa) and/or germ. The term including but not limited to species such as wheat, barley, oat, spelt, rye, sorghum, maize, and rice.

The terms "bran" as used herein refers to a cereal-derived milling fraction enriched in any or all of the tissues to be selected from aleurone, pericarp and seed coat, as compared to the corresponding intact seed.

The term "solubilization" as used herein refers to the solubilization of plant material, such as cereal bran in the methods according to the invention and is intended to include any degree of solubilization. Accordingly the "solubilization" may be to obtain 100% soluble material or it may be to obtain a solubilization degree less than 100%, such as less than 70%, such as in the range of 30%-60%. In some embodiments the solubilization degree is determined on drymatter versus drymatter bran.

The term "at least partly solubilised", as used herein refers to a solubilization degree that is higher than 1%, such as higher than 5, such as higher than 10%. It is to be understood that the action of lipid modifying enzymes may not work optimally according to the invention, if the plant material is not solubilised to a certain extend. In the specific aspects according to the present invention, wherein the lipid modifying enzymes is added to work simultaneously with the treatment to obtain solubilization, such as with a treatment with one or more cell-wall modifying enzyme, the solubilization and action of lipid modifying enzymes will take place at the same time.

The term "milling fraction", as used herein, refers to all or part of the fractions resulting from mechanical reduction of the size of grains, through, as examples but not limited to, cutting, rolling, crushing, breakage or milling, with or without fractionation, through, as examples but not limited to, sieving, screening, sifting, blowing, aspirating, centrifugal sifting, windsifting, electrostatic separation, or electric field separation.

In the context of the present invention, "functional lipids", refers to lipids that have an effect on the product, wherein the functional lipid is used. In some particular embodiments, the functional lipids are emulsifiers or other food improvers.

In the context of the present invention, "cell-wall modifying enzyme", refers to any enzyme capable of hydrolysing or modifying the complex matrix polysaccharides of the plant cell wall, such as any enzyme that will have activity in the "cell wall solubilization assay" included herein. Included within this definition of "cell-wall modifying enzyme" are cellulases, such as cellobiohydrolase I and cellobiohydrolase II, endo-glucanases and beta-glucosidases, xyloglucanases and hemicellulolytic enzymes, such as xylanases.

The terms "cellulases" or "cellulolytic enzymes" as used herein are understood as comprising the cellobiohydrolases (EC 3.2.1.91), e.g., cellobiohydrolase I and cellobiohydrolase II, as well as the endo-glucanases (EC 3.2.1.4) and beta-glucosidases (EC 3.2.1.21).

Included with the definition of cellulases are: endoglucanases (EC 3.2.1.4) that cut the cellulose chains at random; cellobiohydrolases (EC 3.2.1.91) which cleave cellobiosyl units from the cellulose chain ends and beta-glucosidases (EC 3.2.1.21) that convert cellobiose and soluble cellodextrins into glucose. Among these three categories of enzymes involved in the biodegradation of cellulose, cellobiohydrolases are the key enzymes for the degradation of native crystalline cellulose. The term "cellobiohydrolase I" is defined herein as a cellulose 1,4-beta-cellobiosidase (also referred to as exo-glucanase, exo-cellobiohydrolase or 1,4-beta-cellobiohydrolase) activity, as defined in the enzyme class EC 3.2.1.91, which catalyzes the hydrolysis of 1,4-beta-D-glucosidic linkages in cellulose and cellotetraose, by the release of cellobiose from the non-reducing ends of the chains. The definition of the term "cellobiohydrolase II activity" is identical, except that cellobiohydrolase II attacks from the reducing ends of the chains.

The cellulases may comprise a carbohydrate-binding module (CBM) which enhances the binding of the enzyme to a cellulose-containing fiber and increases the efficacy of the catalytic active part of the enzyme. A CBM is defined as contiguous amino acid sequence within a carbohydrate-active enzyme with a discreet fold having carbohydrate-binding activity. For further information of CBMs see the CAZy internet server (Supra) or Tomme et al. (1995) in Enzymatic Degradation of Insoluble Polysaccharides (Saddler and Penner, eds.), Cellulose-binding domains: classification and properties, pp. 142-163, American Chemical Society, Washington. In a preferred embodiment the cellulases or cellulolytic enzymes may be a cellulolytic preparation as defined in U.S. application No. 60/941,251, which is hereby incorporated by reference. In a preferred embodiment the cellulolytic preparation comprising a polypeptide having cellulolytic enhancing activity (GH61A), preferably the one disclosed in WO2005/074656. The cell-wall modifying enzyme may further be a beta-glucosidase, such as a beta-glucosidase derived from a strain of the genus *Trichoderma, Aspergillus* or *Penicillium*, including the fusion protein having beta-glucosidase activity disclosed in U.S. application No. 60/832,511 (Novozymes). In some embodiments the cell-wall modifying enzyme is a CBH II, such as *Thielavia terrestris* cellobiohydrolase II (CEL6A). In some embodiments the cell-wall modifying enzyme is a cellulase enzyme, such as one derived from *Trichoderma reesei*.

The cellulolytic activity may, in some embodiments, be derived from a fungal source, such as a strain of the genus *Trichoderma*, such as a strain of *Trichoderma reesei*; or a strain of the genus *Humicola*, such as a strain of *Humicola insolens*.

In some embodiments the cell-wall modifying enzyme is a polypeptide having cellulolytic enhancing activity (GH61A) disclosed in WO 2005/074656; a cellobiohydrolase, such as *Thielavia terrestris* cellobiohydrolase II (CEL6A), a beta-glucosidase (e.g., the fusion protein disclosed in U.S. application No. 60/832,511) and cellulolytic enzymes, e.g., derived from *Trichoderma reesei*.

In some embodiments the cell-wall modifying enzyme is a polypeptide having cellulolytic enhancing activity (GH61A) disclosed in WO 2005/074656; a beta-glucosidase (e.g., the fusion protein disclosed in U.S. application No. 60/832,511) and cellulolytic enzymes, e.g., derived from *Trichoderma reesei*. In some embodiments the cell-wall modifying enzyme is a commercially available product, such as GC220 available from Genencor, A Danisco Division, US or CELLUCLAST® 1.5 L or CELLUZYME™ available from Novozymes A/S, Denmark.

Endoglucanases (EC 3.2.1.4) catalyses endo hydrolysis of 1,4-beta-D-glycosidic linkages in cellulose, cellulose derivatives (such as carboxy methyl cellulose and hydroxy ethyl cellulose), lichenin, beta-1,4 bonds in mixed beta-1,3 glucans such as cereal beta-D-glucans or xyloglucans and other plant material containing cellulosic parts. The authorized name is endo-1,4-beta-D-glucan 4-glucano hydrolase, but the abbreviated term endoglucanase is used in the present specification. Endoglucanase activity may be determined using carboxymethyl cellulose (CMC) hydrolysis according to the procedure of Ghose, 1987, Pure and Appl. Chem. 59: 257-268.

In some embodiments endoglucanases may be derived from a strain of the genus *Trichoderma*, such as a strain of *Trichoderma reesei*; a strain of the genus *Humicola*, such as a strain of *Humicola insolens*; or a strain of *Chrysosporium*, preferably a strain of *Chrysosporium lucknowense*.

The term "cellobiohydrolase" means a 1,4-beta-D-glucan cellobiohydrolase (E.C. 3.2.1.91), which catalyzes the hydrolysis of 1,4-beta-D-glucosidic linkages in cellulose, cellooligosaccharides, or any beta-1,4-linked glucose containing polymer, releasing cellobiose from the reducing or non-reducing ends of the chain.

Examples of cellobiohydrolases are mentioned above including CBH I and CBH II from *Trichoderma reseei; Humicola insolens* and CBH II from *Thielavia tenrestris* cellobiohydrolase (CELL6A).

Cellobiohydrolase activity may be determined according to the procedures described by Lever et al., 1972, Anal. Biochem. 47: 273-279 and by van Tilbeurgh et al., 1982, FEBS Letters 149: 152-156; van Tilbeurgh and Claeyssens, 1985, FEBS Letters 187: 283-288. The Lever et al. method is suitable for assessing hydrolysis of cellulose in corn stover and the method of van Tilbeurgh et al., is suitable for determining the cellobiohydrolase activity on a fluorescent disaccharide derivative.

The term "beta-glucosidase" means a beta-D-glucoside glucohydrolase (E.C. 3.2.1.21), which catalyzes the hydrolysis of terminal non-reducing beta-D-glucose residues with the release of beta-D-glucose. For purposes of the present invention, beta-glucosidase activity is determined according to the basic procedure described by Venturi et al., 2002, J. Basic Microbiol. 42: 55-66, except different conditions were employed as described herein. One unit of beta-glucosidase activity is defined as 1.0 μmole of p-nitrophenol produced per minute at 500 C, pH 5 from 4 mM p-nitrophenyl-beta-D-glucopyranoside as substrate in 100 mM sodium citrate, 0.01% TWEEN® 20.

In some embodiments the beta-glucosidase is of fungal origin, such as a strain of the genus *Trichoderma, Aspergillus* or *Penicillium*. In some embodiments the beta-glucosidase is a derived from *Trichoderma reesei*, such as the beta-glucosidase encoded by the bgl 1 gene (see EP 562003). In another embodiment the beta-glucosidase is derived from *Aspergillus oryzae* (recombinantly produced in *Aspergillus oryzae* according to WO 02/095014), *Aspergillus fumigatus* (recombinantly produced in *Aspergillus oryzae* according to Example 22 of WO 02/095014) or *Aspergillus niger* (1981, J. Appl. 3: 157-163).

The terms "hemicellulolytic enzymes" or "hemicellulases", as used herein, refers to enzymes that may break down hemicellulose.

Any hemicellulase suitable for use in hydrolyzing hemicellulose, preferably into arabinoxylan oligosaccharides, may be used. Preferred hemicellulases include xylanases, arabinofuranosidases, acetyl xylan esterase, feruloyl esterase, glucuronidases, galactanase, endo-galactanase, mannases, endo or exo arabinases, exo-galactanses, pectinase, xyloglucanase, or mixtures of two or more thereof. An example of hemicellulase suitable for use in the present invention includes Grindamyl Powerbake 930 (available from Danisco A/S, Denmark) or VISCOZYME™ (available from Novozymes A/S, Denmark). In an embodiment the hemicellulase is a xylanase. In an embodiment the xylanase is of microbial origin, such as of fungal origin (e.g., *Trichoderma, Meripilus, Humicola, Aspergillus, Fusarium*) or from a bacterium (e.g., *Bacillus*). In some embodiments the xylanase is derived from a filamentous fungus, preferably derived from a strain of *Aspergillus*, such as *Aspergillus aculeatus*; or a strain of *Humicola*, preferably *Humicola lanuginosa*. The xylanase may preferably be an endo-1,4-beta-xylanase, more preferably an endo-1,4-beta-xylanase of GH 10 or GH11. Examples of commercial xylanases include Grindamyl H121 or Grindamyl Powerbake 930 from Danisco A/S, Denmark or SHEARZYME™ and BIOFEED WHEAT™ from Novozymes A/S, Denmark.

Arabinofuranosidase (EC 3.2.1.55) catalyzes the hydrolysis of terminal non-reducing alpha-L-arabinofuranoside residues in alpha-L-arabinosides. Galactanase (EC 3.2.1.89), arabinogalactan endo-1,4-beta-galactosidase, catalyses the endohydrolysis of 1,4-D-galactosidic linkages in arabinogalactans.

Pectinase (EC 3.2.1.15) catalyzes the hydrolysis of 1,4-alpha-D-galactosiduronic linkages in pectate and other galacturonans.

Xyloglucanase catalyzes the hydrolysis of xyloglucan.

The term "xylanase" as used herein refers to an enzyme that is able to hydrolyze the beta-1,4 glycosyl bond in non-terminal beta-D-xylopyranosyl-1,4-beta-D-xylopyranosyl units of xylan or arabinoxylan. Other names include 1,4-beta-D-xylan xylanohydrolase, 1,4-beta-xylan xylanohydrolase, beta-1,4-xylan xylanohydrolase, (1-4)-beta-xylan 4-xylanohydrolase, endo-1,4-beta-xylanase, endo-(1-4)-beta-xylanase, endo-beta-1,4-xylanase, endo-1,4-beta-D-xylanase, endo-1,4-xylanase, xylanase, beta-1,4-xylanase, beta-xylanase, beta-D-xylanase. Xylanases can be derived from a variety of organisms, including plant, fungal (e.g. species of *Aspergillus, Penicillium, Disporotrichum, Neurospora, Fusarium, Humicola, Trichoderma*) or bacterial species (e.g. species of *Bacillus, Aeromonas, Streptomyces, Nocardiopsis, Thermomyces*) (see for example WO92/17573, WO92/01793, WO91/19782, WO94/21785).

In one aspect of the invention, the xylanase used in the methods of the invention is an enzyme classified as EC 3.2.1.8. The official name is endo-1,4-beta-xylanase. The systematic name is 1,4-beta-D-xylan xylanohydrolase. Other names may be used, such as endo-(1-4)-beta-xylanase; (1-4)-beta-xylan 4-xylanohydrolase; endo-1,4-xylanase; xylanase; beta-1,4-xylanase; endo-1,4-xylanase; endo-beta-1,4-xylanase; endo-1,4-beta-D-xylanase; 1,4-beta-xylan xylanohydrolase; beta-xylanase; beta-1,4-xylan xylanohydrolase; endo-1,4-beta-xylanase; beta-D-xylanase. The reaction catalyzed is the endohydrolysis of 1,4-beta-D-xylosidic linkages in xylans.

In one aspect of the invention, the xylanase of the invention is a xylanase of Glycoside Hydrolyase (GH) Family 11. The term "of Glycoside Hydrolyase (GH) Family 11" means that the xylanase in question is or can be classified in the GH family 11.

In one aspect of the invention, the xylanase used according to the invention, is a xylanase having xylanase activity as measured in the "Xylanase assay" as described herein.

According to the Cazy(ModO) site, Family 11 glycoside hydrolases can be characterised as follows:
Known Activities: xylanase (EC 3.2.1.8)
Mechanism: Retaining
Catalytic Nucleophile/Base: Glu (experimental)
Catalytic Proton Donor: Glu (experimental)
3D Structure Status: Fold: β-jelly roll
Clan: GH-C As used herein, "Clan C" refers to groupings of families which share a common three-dimensional fold and identical catalytic machinery (see, for example, Henrissat, B. and Bairoch, A., (1996) Biochem. J., 316, 695-696).

As used herein, "Family 11" refers to a family of enzymes as established by Henrissat and Bairoch (1993) Biochem J., 293, 781-788 (see, also, Henrissat and Davies (1997) Current Opinion in Structural Biol. 1997, &:637-644). Common features for family 11 members include high genetic homology, a size of about 20 kDa and a double displacement catalytic mechanism (see Tenkanen et al., 1992; Wakarchuk et al., 1994). The structure of the family 11 xylanases includes two large β-sheets made of β-strands and α-helices.

Family 11 xylanases include the following: *Aspergillus niger* XynA, *Aspergillus kawachii* XynC, *Aspergillus tubigensis* XynA, *Bacillus circulans* XynA, *Bacillus punzilus* XynA, *Bacillus subtilis* XynA, *Neocalliniastix patriciarum* XynA, *Streptomyces lividans* XynB, *Streptomyces lividans* XynC, *Streptomyces therinoviolaceus* XynII, *Thermomonospora fusca* XynA, *Trichoderma harzianum* Xyn, *Trichoderma reesei* XynI, *Trichoderma reesei* XynII, *Trichoderma viride* Xyn.

In the context of the present invention, "starch modifying enzyme", refers to any enzyme that catalyze the hydrolysis of α-1,3 and/or α-1,6 glucosidic linkages in glucosides. Included within this term is glycoside hydrolases typically named after the substrate that they act upon. In some embodiments according to the invention, the "starch modifying enzyme" is selected from lactase, amylase, pullulanase, isoamylase, chitinase, sucrase, maltase, neuraminidase, invertase, hyaluronidase and lysozyme.

In some embodiments the starch modifying enzyme is a starch debranching enzyme.

In one aspect of the invention, the starch modifying enzyme used according to the invention, is an enzyme having starch debranching activity as measured in the "Starch debranching activity assay" as described herein.

Starch debranching enzymes include pullulanase (EC 3.2.1.41) and Isoamylase (EC 3.2.1.68). They hydrolyse α-1,6-D-glucosidic branch linkages in amylopectin, β-limit dextrins and pullulans. Isomylases can be distinguished from pullulanases (EC 3.2.1.41) by the inability of isoamylase to attack pullulan, and by the limited action on α-limit dextrins.

By "amylase" is meant to include any amylase such as glucoamylases, α-amylase, β-amylases and wild-type α-amylases of *Bacillus* sp., such as *B. licheniformis* and *B. subtilis*. "Amylase" shall mean an enzyme that is, among other things, capable of catalyzing the degradation of starch. Amylases are hydrolases that cleave the α-D-(I→4) β-glycosidic linkages in starch. Generally, α-amylases (EC 3.2.1.1; α-D-(I→4)-glucan glucanohydrolase) are defined as endo-acting enzymes cleaving α-D-(I→>4) O-glycosidic linkages within the starch molecule in a random fashion. In contrast, the exo-acting amylolytic enzymes, such as β-amylases (EC 3.2.1.2; α-D-(I→4)-glucan maltohydrolase) and some product-specific amylases like maltogenic α-amylase (EC 3.2.1.133) cleave the starch molecule from the non-reducing end of the substrate, β-Amylases, α-glucosidases (EC 3.2.1.20; α-D-glucoside glucohydrolase), glucoamylase (EC 3.2.1.3; α-D-(I-→4)-glucan glucohydrolase), and product-specific amylases can produce glucose from starch.

By "α-amylase variant", "α-amylase variant polypeptide", and "variant enzyme" are meant an α-amylase protein that has been modified by substituting amino acid residues at the amino terminus of the mature α-amylase protein. As used herein, "parent enzymes," "parent sequence", "parent polypeptide", "wild-type α-amylase protein", and "parent polypeptides" shall mean enzymes and polypeptides from which the α-amylase variant polypeptides are derived. The parent enzyme may be a wild-type enzyme or an α-amylase that had previously been recombinantly engineered. The α-amylase variant can further include mutations in the signal sequence of the α-amylase parent polypeptide, or elsewhere in the α-amylase parent polypeptide. Thus, the α-amylase polypeptide can be a recombinantly engineered enzyme.

In one aspect of the invention, the α-amylase used according to the invention, is an α-amylase having α-amylase activity as measured in the "α-amylase assay" as described herein.

In one aspect of the invention, the beta-amylase used according to the invention, is a beta-amylase having beta-amylase activity as measured in the "beta-amylase assay" as described herein.

The term "pullulanase" refers to a specific kind of glucanase, an amylolytic endoenzyme that degrades pullulan. It is produced as, for example, an extracellular, cell surface-anchored lipoprotein by Gram-negative bacteria of the genus *Klebsiella*. Gram-positive bacteria, however, produce pullulanases as secreted proteins. Type I pullulanases specifically attack α-1,6 linkages, while type II pullulanases are also able to hydrolyse α-1,4 linkages. It is also produced by some other bacteria and archaea. Pullulanase is used as a detergent in biotechnology. Pullulanase (EC 3.2.1.41) is also known as pullulan-6-glucanohydrolase (debranching enzyme). Pullulan is regarded as a chain of maltotriose units linked by α-I,6-glucosidic bonds. Pullulanase will hydrolytically cleave pullulan (α-glucan polysaccharides).

The term "transglucosylation enzyme" refers to any enzyme having transglucosidase activity, such as transglucosidase. The term "transglucosidase" refers to an enzyme that transfers an α-D-glucosyl residue in a 1,4-α-D-glucan to the primary hydroxy group of glucose, free or combined in a 1,4-α-D-glucan. The transglucosidase described herein has an activity described as EC 2.4.1.24, according to IUBMB enzyme nomenclature. The systematic name for the transglucosidase described herein is 1,4-α-D-glucan:I,4-α-D-glucan(D-glucose) 6-α-D-glucosyltransferase. This enzyme may be referred to as α-glucosidase in certain publications.

As noted above, the transglucosidase enzyme generally has an activity defined as EC 2.4.1.24, according to IUBMB enzyme nomenclature, which activity transfers glucosyl residues in certain glucans to the primary hydroxy group of glucose. In some embodiments, the enzyme may also have an activity that degrades natural gum polysaccharide (e.g., xanthan, and galactomannan-containing polysaccharides such as guar gum or lima bean gum), by clipping off sugar side chains or cleaving internal bonds to break the polysaccharide backbone. Any suitable transglucosidase enzyme finds use in the present invention (See e.g., Pazur et al, Carbohydr. Res. 1986 149:137-47; and Nakamura et al, J. Biotechnol., 53:75-84, 1997). In some embodiments, the transglucosidase enzyme that find use in the present invention are commercially available (e.g., including but not limited to enzymes obtained from Megazyme, Wicklow, Ireland; or Danisco US Inc., Genencor Division, Palo Alto, Calif.). In some embodiments, the enzyme is an *Aspergillus niger* transglucosidase produced in *Trichoderma reesei* cells. In some additional embodiments, the transglucosidase is a wild type fungal transglucosidase (e.g., including but not limited to a fungal transglucosidase having an amino acid sequence deposited in NCBI's GENBANK® database as accession numbers: D45356 (GID:2645159; *Aspergillus niger*), BAD06006.1 (GID:4031328; *Aspergillus awamori*), BAA08125.1 {GIO:\054565; *Aspergillus oryzae*), XPJ)OI 210809.1 (GID: 1 15492363; *Aspergillus terreus*), XP_001271891.1 (GID: 121707620; *Aspergillus clavatus*), XPJ)01266999.1 (GID: 1 19500484; *Neosartorya fischeri*), XP 75181 1.1 (GID:70993928; *Aspergillus fumigatus*), XP_659621.1 (GID:67523121; *Aspergillus nidulans*), XP_001216899.1 (GID: 115433524; *Aspergillus terreus*) and XPJ)01258585.1 (GID: 119473371; *Neosartorya fisch*- eri)), or a variant thereof that has an amino acid sequence that is at least about 70% identical, at least about 80% identical, at least about 85% identical, at least about 90% identical, at least about 95% identical, or at least about 98% identical to a wild type fungal transglucosidase.

In one aspect of the invention, the transglucosidase used according to the invention, is a transglucosidase having transglucosidase activity as measured in the "transglucosidase assay" as described herein.

Enzyme activity assays according to the invention:

Cell Wall Solubilization Assay:

Preferably, bran solubility is measured using the following assay.

A suspension of wheat bran in (0.1 M)-di-sodium-hydrogen phosphate (0.2 M) buffer, pH 5.0 is prepared to an concentration of 1.33% bran (w/w). From this suspension, aliquots of 750 μl are transferred into eppendorph tubes under stirring. Each substrate tube is pre-heated for 5 minutes at 40° C. Hereto, 250 μl enzyme solution is added, making the end concentration of substrate 1%. Three dilutions (in duplicate) are made from each enzyme composition according to the invention, with increasing enzyme concentration (e.g. 0.33; 1.0 and 3.0 μg enzyme/gram bran) to each time of determination (0, 30, 60 and 240 minutes). As blank, a heat denaturated solution of the enzyme composition is used. The reaction is terminated to the given times, by transferring the tubes to a incubator set at 95° C. Heat denaturated samples are kept at 4° C. until all enzyme reactions are terminated. When all enzyme reactions are terminated, Eppendorph tubes are centrifuged to obtain a clear supernatant. The enzymes capability to solubilise bran is expressed as the increase in reducing end groups as determined using PAHBAH (Lever, 1972).

If the bran used contain residual starch, side activities such as amylase activity, may interfere with the above assay, bran solubilization assay should only be carried out on purified cell wall modifying enzymes (having no amylase activity).

Xylanase Assay (Endo-β-1,4-Xylanase Activity)

Samples were diluted in citric acid (0.1 M)-di-sodium-hydrogen phosphate (0.2 M) buffer, pH 5.0, to obtain approx. $OD_{590}$=0.7 in this assay. Three different dilutions of the sample were pre-incubated for 5 minutes at 40° C. At time=5 minutes, 1 Xylazyme tablet (crosslinked, dyed xylan substrate, Megazyme, Bray, Ireland) was added to the enzyme solution in a reaction volume of 1 ml. At time=15 minutes the reaction was terminated by adding 10 ml of 2% TRIS/NaOH, pH 12. Blanks were prepared using 1000 μl buffer instead of enzyme solution. The reaction mixture was centrifuged (1500×g, 10 minutes, 20° C.) and the OD of the supernatant was measured at 590 nm. One xylanase unit (XU) is defined as the xylanase activity increasing $OD_{590}$ with 0.025 per minute.

α-amylase Activity:

α-amylases hydrolyze α-D-1,4-glucosidic linkages and its activity can be detected as a rate of color change of a starch-iodine solution due to hydrolysis of alpha 1,4-D-linkages.

Beta-amylase Activity:

Beta-amylase activity can be detected as the liberation of maltose from the non-reducing end of a starch solution.

Transglucosidase Activity:

Transglucosidase catalyzes both hydrolytic and transfer reactions on incubation with α-D-glucooligosaccharides. Transglucosidse activity can be detected as the formation of isomaltooligosaccharides such as isomaltose, pansose and isomaltotriose upon incubation with maltose or maltodextrin.

Starch Debranching Activity Assay:

Enzymes specific for the α-D-1,6 glucosidic linkages in starch currently include isoamylase (EC 3.2.1.68) and pullulanases (EC 3.2.1.41). Enzymes acting on α-D-1,6 glucosidic linkages of starch are also classified by their action on pullulan and their activity is measured as the specific hydrolysis of α-D-1,6 glucosidic linkages of starch and pullulan.

The term "lipid modifying enzyme", as used herein refers to any enzyme that can modify a lipid.

In some preferred embodiments the lipid modifying enzyme is a lipolytic enzyme, such as a lipase.

The term "Lipolytic enzyme" as used herein refers to any enzyme that hydrolyse one or more of the fatty acids from lipids present in a plant material, such as in cereal bi-streams which can result in the formation of functional lipids within the cereal bi-stream which provide commercially value. The molecules which contribute the most significant functional effects are the molecules with emulsifier characteristics which are the partial hydrolysis products, such as lyso-phospholipids, lyso-glycolipids, and mono-glyceride molecules. The polar lipid hydrolysis products, such as lyso-phospholipids and lyso-glycolipids are particularly advantageous in bread making, and can give equivalent functionality as emulsifiers, such as DATEM.

The substrates for lipases in the cereal bi-streams are the bran lipids which are a complex mixture of polar and non-polar lipids. The polar lipids can be divided into glycolipids and phospholipids. These lipids are built up of glycerol esterified with two fatty acids and a polar group. The polar group contributes to surface activity of these lipids. Enzymatic cleavage of one of the fatty acids in these lipids leads to lipids with a much higher surface activity. It is well known that emulsifiers, such as DATEM, with high surface activity are very functional when added to food product.

The use of lipases (E.C. 3.1.1.X) in dough products may have a detrimental impact on yeast activity, and/or a negative effect on bread volume. The negative effect on bread volume is often explained by overdosing. Overdosing can lead to a decrease in gluten elasticity which results in a dough which is too stiff and thus results in reduced bread volumes. In addition, or alternatively, such lipases can degrade shortening, oil or milk fat added to the dough, resulting in off-flavour in the dough and baked product. Overdosing and off flavour have been attributed to the accumulation of free fatty acids in the dough. In relation to the present invention these un-wanted effects can be avoided as the lipase is added to the cereal bi-stream as e.g. a cereal bran suspension, the functional lipids are then generated in the cereal bran suspension, which is used with or without further processing as a dough improver. A further processing can be dilution, purification of the functional lipids. Furthermore, the functional lipids may be processed to be supplied as a liquid product or as a dry formulated product, such as a freeze dried product.

In EP1193314, EP0977869, WO02/094123, WO00/32758 and also in WO01/39602, the use of lipolytic enzymes active on glycolipids was reported to be particularly beneficial in application in bread making as the partial hydrolysis products the lyso-glycolipids were found to have very high emulsifier functionality, apparently resulting in a higher proportion of positive emulsifier functionality compared to the detrimental accumulation of free fatty acids. However, the enzymes were also found to have significant non selective activity on triglyceride which resulted in unnecessarily high free fatty acid. Further the application of lipases in bread making has been the addition of lipase to the dough followed by an in-situ generation of emulsifier in the dough.

The lipase may be of any origin, e.g. of animal origin (such as, e.g. mammalian), e.g. from pancreas (e.g. bovine or porcine pancreas), or snake venom or bee venom. Alternatively, the lipase may be of microbial origin, e.g. from filamentous fungi, yeast or bacteria, such as the genus or species *Aspergillus*, e.g. *A. niger*, *Dictyostelium*, e.g. *D. discoideum*; *Magnaporthe*, e.g. *M. grisae*, *Mucor*, e.g. *M. javanicus*, *M. mucedo*, *M. subtilissimus*; *Neurospora*, e.g. *N. crassa*; *Rhizomucor*, e.g. *R. pusillus*; *Rhizopus*, e.g. *R. arrhizus*, *R. japonicus*, *R. stolonifer*, *Sclerotinia*, e.g. *S. libertiana*; *Trichophyton*, e.g. *T. rubrum*; *Whetzelinia*, e.g. *W. sclerotiorum*; *Bacillus*, e.g. *B. megaterium*, *B. subtilis*; *Citrobacter*, e.g. *C. freundii*; *Enterobacter*, e.g. *E. aerogenes*, *E. cloacae Edwardsiella*, *E. tarda*; *Erwinia*, e.g. *E. herbicola*; *Escherichia*, e.g. *E. coli*; *Klebsiella*, e.g. *K. pneumoniae*; *Proteus*, e.g. *P. vulgaris*; *Providencia*, e.g. *P. stuartii*; *Salmonella*, e.g. *S. typhimurium*; *Serratia*, e.g. *S. liquefasciens*, *S. marcescens*; *Shigella*, e.g. *S. flexneri*; *Streptomyces*, e.g. *S. violeceoruber*, *Yersinia*, e.g. *Y. enterocolitica*. Thus, the lipase may be fungal, e.g. from the class *Pyrenomycetes*, such as the genus *Fusarium*, such as a strain of *F. culmorum*, *F. heterosporum*, *F. solani*, or a strain of *F. oxysporum*. The phospholipase may also be from a filamentous fungus strain within the genus *Aspergillus*, such as a strain of *Aspergillus awamori*, *Aspergillus foetidus*, *Aspergillus japonicus*, *Aspergillus niger* or *Aspergillus oryzae*.

A commercially preferred source of lipolytic enzymes is a microbial lipase or acyltransferase.

In some embodiments, the lipase is from filamentous fungi, such as *Aspergillus* spp. and *Fusarium* spp. Lipases isolated from filamentous fungi have been found to have industrially applicable characteristics and also have been found to be routine to express in heterologous production systems, such as in *Aspergillus oryzae*, *Trichoderma reesie*, *Fusarium* and yeast.

In some embodiments, the lipase is from *Aspergillus tubingensis* as disclosed in EP1433852, which patent is hereby incorporated by reference.

In some embodiments, the lipase is from *Fusarium heterosporum* as disclosed in EP1722636, which patent is hereby incorporated by reference.

In some embodiments, the lipase is from *Fusarium oxysporum* as identified in EP 0 130 064, or in Hoshino et al. (1992) Biosci. Biotech. Biochem 56: 660-664.

In some embodiments, the lipase is porcine pancreatic phospholipase A2 for example expressed in *Aspergillus niger* (Cakezyme™, DSM).

In some embodiments, the lipase is as described in EP0 869 167, wherein the cloning and expression of a *Fusarium oxysporum* lipase and its use in baking is disclosed. The enzyme is described as having phospholipase activity. This enzyme is now sold by Novozymes A/S (Denmark) as Lipopan F™.

In some embodiments, the lipase is as described in WO 02/00852, which discloses five lipase enzymes and their encoding polynucleotides, isolated from *F. venenatum*, *F. sulphureum*, *A. berkeleyanum*, *F. culmorum* and *F. solani*. All five enzymes are described as having triacylglycerol hydrolysing activity, phospholipase and galactolipase activity. Three of the enzymes have equivalent activity to the *F. oxysporum* enzyme taught in EP 0 869 167: *F. venenatum*, *F. sulphureum*, *F. culmorum*.

In some embodiments, the lipid modifying enzyme is a lipolytic enzyme variant. Lipolytic enzyme variants, with specific amino acid substitutions and fusions, have been produced, some of which have an enhanced activity on the polar lipids compared to the wild-type parent enzymes. WO01/39602 describes such a variant, referred to as SP979, which is a fusion of the *Thermomyces lanuginosus* lipase, and the *Fusarium oxysporum* lipase described in EP 0 869 167. This variant has been found to have a significantly high ratio of activity on phospholipids and glycolipids compared to triglycerides.

In some embodiments, the lipid modifying enzyme is a lipid acyltransferase.

The term "lipid acyltransferase" as used herein means an enzyme which as well as having lipase activity (generally classified as E.C. 3.1.1.x in accordance with the Enzyme Nomenclature Recommendations (1992) of the Nomenclature Committee of the International Union of Biochemistry and Molecular Biology) also has acyltransferase activity (generally classified as E.C. 2.3.1.x), whereby the enzyme is capable of transferring an acyl group from a lipid to one or more acceptor substrates, such as one or more of the following: a sterol; a stanol; a carbohydrate; a protein; a protein subunit; glycerol.

In some embodiments, the lipid acyltransferase for use in the methods and/or uses of the present invention is capable of transferring an acyl group from a lipid (as defined herein) to one or more of the following acyl acceptor substrates: a sterol, a stanol, a carbohydrate, a protein or subunits thereof, or a glycerol.

For some aspects the acyl acceptor may be any compound comprising a hydroxy group (—OH), such as for example, polyvalent alcohols, including glycerol; sterol; stanols; carbohydrates; hydroxy acids including fruit acids, citric acid, tartaric acid, lactic acid and ascorbic acid; proteins or a sub-unit thereof, such as amino acids, protein hydrolysates and peptides (partly hydrolysed protein) for example; and mixtures and derivatives thereof.

In some embodiments, the lipid substrate upon which the lipid acyltransferase used according to the present invention acts is one or more of the following lipids: a phospholipid, such as a lecithin, e.g. phosphatidylcholine, a triacylglyceride, a cardiolipin, a diglyceride, or a glycolipid, such as digalactosyldiglyceride (DGDG) for example. The term lecithin as used herein encompasses phosphatidylcholine, phosphatidylethanolamine, phosphatidylinositol, phosphatidylserine and phosphatidylglycerol.

For some aspects, preferably the lipid substrate upon which the lipid acyltransferase acts is a phospholipid, such as lecithin, for example phosphatidylcholine or phosphatidylinositol.

In some embodiments the lipid substrate is a food lipid, that is to say a lipid component of a food product.

Suitably, the lipid acyltransferase used according to the present invention may exhibit one or more of the following lipase activities: glycolipase activity (E.C. 3.1.1.26), triacylglycerol lipase activity (E.C. 3.1.1.3), phospholipase A2 activity (E.C. 3.1.1.4) or phospholipase A1 activity (E.C. 3.1.1.32). The term "glycolipase activity" as used herein encompasses "galactolipase activity".

Suitably, the lipid acyltransferase used according to the present invention may have at least one or more of the following activities: glycolipase activity (E.C. 3.1.1.26) and/or phospholipase A1 activity (E.C. 3.1.1.32) and/or phospholipase A2 activity (E.C. 3.1.1.4).

For some aspects, preferably the lipid acyltransferase used according to the present invention is capable of transferring an acyl group from a glycolipid and/or a phospholipid to a sterol and/or a stanol to form at least a sterol ester and/or a stanol ester.

Suitable sterol acyl acceptors include cholesterol and phytosterols, for example alpha-sitosterol, beta-sitosterol, stigmasterol, ergosterol, campesterol, 5,6-dihydrosterol, brassicasterol, alpha-spinasterol, beta-spinasterol, gamma-spinasterol, deltaspinasterol, fucosterol, dimosterol, ascosterol, serebisterol, episterol, anasterol, hyposterol, chondrillasterol, desmosterol, chalinosterol, poriferasterol, clionasterol, sterol glycosides, and other natural or synthetic isomeric forms and derivatives.

In one aspect, preferably the acyl acceptor is one or more of the following: alpha-sitosterol, beta-sitosterol, stigmasterol, ergosterol, beta-sitostanol, ss-sitostanol or campesterol.

For some aspects, preferably the lipid acyltransferase used according to the present invention is capable of transferring an acyl group from a glycolipid and/or a phospholipid to glycerol to form at least a diglyceride and/or a monoglyceride.

For some aspects, one or more sterols present in the lipid-containing plant material may be converted to one or more stanols prior to or at the same time as the lipid acyltransferase is added according to the present invention. Any suitable method for converting sterols to stanols may be employed. For example, the conversion may be carried out by chemical hydrogenation for example. The conversion may be conducted prior to the addition of the lipid acyltransferase in accordance with the present invention or simultaneously with the addition of the lipid acyltransferase in accordance with the present invention. Suitably enzymes for the conversion of sterol to stanols are taught in WO00/061771.

Suitably the present invention may be employed to produce phytostanol esters in the lipid plant material. Phytostanol esters have increased solubility through lipid membranes, bioavailability and enhanced health benefits (see for example WO92/99640).

Protocol for the Determination of % Acyltransferase Activity:

The lipid-containing plant material to which a lipid acyltransferase has been added according to the present invention may be extracted following the enzymatic reaction with $CHCl_3:CH_3OH$ 2:1 and the organic phase containing the lipid material is isolated and analysed by GLC and HPLC according to the procedure detailed herein below. From the GLC and HPLC analyses the amount of free fatty acids and one or more of sterol/stanol esters; carbohydrate esters, protein esters; diglycerides; or monoglycerides are determined. A control of the lipid-containing plant material to which no enzyme has been added, is analysed in the same way.

Calculation:

From the results of the GLC and HPLC analyses the increase in free fatty acids and sterol/stanol esters and/or carbohydrate esters and/or protein esters and/or diglycerides and/or monoglycerides can be calculated:

$\Delta$% fatty acid=% Fatty acid(enzyme)−% fatty acid (control); $Mv$ fatty acid=average molecular weight of the fatty acids;

$A\Delta$% sterol ester/$Mv$ sterol ester (where $\Delta$% sterol ester=% sterol/stanol ester(enzyme)−% sterol/stanol ester(control) and $Mv$ sterol ester=average molecular weight of the sterol/stanol esters)–applicable where the acyl acceptor is a sterol and/or stanol;

$B$=$\Delta$% carbohydrate ester/$Mv$ carbohydrate ester (where $\Delta$% carbohydrate ester=% carbohydrate ester(enzyme)−% carbohydrate ester(control) and $Mv$ carbohydrate ester=average molecular weight of the carbohydrate ester)–applicable where the acyl acceptor is a carbohydrate;

$C$=$\Delta$% protein ester/$Mv$ protein ester (where $\Delta$% protein ester=% protein ester(enzyme)−% protein ester(control) and $Mv$ protein ester=average molecular weight of the protein ester)–applicable where the acyl acceptor is a protein; and $D$=absolute value of diglyceride and/or monoglyceride/$Mv$ di/monoglyceride (where $\Delta$% diglyceride and/or monoglyceride=% diglyceride and/or monoglyceride (enzyme)−% diglyceride and/or monoglyceride (control) and $Mv$ di/monoglyceride=average molecular weight of the diglyceride and/or monoglyceride)–applicable where the acyl acceptor is glycerol.

The transferase activity is calculated as a percentage of the total enzymatic activity:

$$\% \text{ transferase activity} = \frac{A^* + B^* + C^* + D^* \times 100}{A^* + B^* + C^* + D^* + \Delta \% \text{ fatty acid}/(Mv \text{ fatty acid})}$$

(*delete as appropriate).

In a preferred aspect the present invention provides a lipid-containing plant material wherein the lipids have been modified into functional lipids by the action of lipolytic enzymes. This can be used either with or without purification of the functional lipids as a food product ingredient.

Suitably, the terms "foodstuff" or "food product" as used herein may mean a food product in a form which is ready for consumption. Alternatively or in addition, however, the term food product as used herein may mean one or more food materials which are used in the preparation of a food product. By way of example only, the term food product encompasses both baked goods produced from dough as well as the dough used in the preparation of said baked goods.

Suitably, the term "food product" as used herein means a substance which is suitable for human and/or animal consumption.

In another aspect, the food product in accordance with the present invention may be an animal feed.

In some embodiments, the food product used according to the present invention is selected from one or more of the following: eggs, egg-based products, including but not limited to mayonnaise, salad dressings, sauces, ice creams, egg powder, modified egg yolk and products made therefrom; baked goods, including breads, cakes, sweet dough products, laminated doughs, liquid batters, muffins, doughnuts, biscuits, crackers and cookies; confectionery, including chocolate, candies, caramels, halawa, gums, including sugar free and sugar sweetened gums, bubble gum, soft bubble gum, chewing gum and puddings; frozen products including sorbets, preferably frozen dairy products, including ice cream and ice milk; dairy products, including cheese, butter, milk, coffee cream, whipped cream, custard cream, milk drinks and yoghurts; mousses, whipped vegetable creams, meat products, including processed meat products; edible oils and fats, aerated and non-aerated whipped products, oil-in-water emulsions, water-in-oil emulsions, margarine, shortening and spreads including low fat and very low fat spreads;

dressings, mayonnaise, dips, cream based sauces, cream based soups, beverages, spice emulsions and sauces.

Suitably the food product in accordance with the present invention may be a "fine foods", including cakes, pastry, confectionery, chocolates, fudge and the like.

In one aspect the food product in accordance with the present invention may be a dough product or a baked product, such as a bread, a fried product, a snack, cakes, pies, brownies, cookies, noodles, instant noodles, tortillas, snack items such as crackers, graham crackers, pretzels, and potato chips, and pasta, and breakfast cereals.

In a further aspect, the food product in accordance with the present invention may be a plant derived food product such as flours, pre-mixes, oils, fats, cocoa butter, coffee whitener, salad dressings, margarine, spreads, peanut butter, shortenings, ice cream, cooking oils.

In another aspect, the food product in accordance with the present invention may be a dairy product, including butter, milk, cream, cheese such as natural, processed, and imitation cheeses in a variety of forms (including shredded, block, slices or grated), cream cheese, ice cream, frozen desserts, yoghurt, yoghurt drinks, butter fat, anhydrous milk fat, other dairy products. The enzyme used according to the present invention may improve fat stability in dairy products.

In another aspect, the food product in accordance with the present invention may be a food product containing animal derived ingredients, such as processed meat products, cooking oils, shortenings.

In a further aspect, the food product in accordance with the present invention may be a beverage, a fruit, mixed fruit, a vegetable or wine. In some cases the beverage may contain up to 20 g/l of added phytosterols derived from the invention.

In another aspect, the food product in accordance with the present invention may be an animal feed. The animal feed may be enriched with phytosterol and/or phytostanols, preferably with beta-sitosterol/stanol. Suitably, the animal feed may be a poultry feed. When the food product is poultry feed, the present invention may be used to lower the cholesterol content of eggs produced by poultry fed on the food product according to the present invention.

In one aspect preferably the food product is selected from one or more of the following: eggs, egg-based products, including mayonnaise, salad dressings, sauces, ice cream, egg powder, modified egg yolk and products made therefrom.

Preferably the food product according to the present invention is a water containing food product. Suitably the food product may be comprised of 10-98% water, suitably 14-98%, suitably of 18-98% water, suitably of 20-98%, suitably of 40-98%, suitably of 50-98%, suitably of 70-98%, suitably of 75-98%.

In one aspect of this invention the functional lipid produced from the lipid-containing plant material is an emulsifier. Preferable, at least one emulsifier is generated in the lipid-containing plant material.

In one aspect of the invention at least two different emulsifiers are generated in the lipid containing material.

In one aspect of the invention at least three different emulsifiers are generated in the lipid containing material.

In one aspect of the invention at least four emulsifiers are generated in the lipid containing material.

Suitably, the emulsifier in accordance with the present invention may be for example one or more of the following: a diglyceride, a monoglyceride, such as 1-monoglyceride or a lysolecithin, such as lysophosphatidylcholine or phosphatidylinositol, for example, a digalactosyl monoglyceride (DGMG). The emulsifier is preferably produced from the lipid acyl donor following removal of one or more acyl groups from said lipid acyl donor. The term lysolecithin as used herein encompasses lysophosphatidylcholine, lysophosphatidylethanolamine, lysophosphatidylinositol, lysophosphatidylserine and lysophosphatidylglycerol. The term lysophosphatidylcholine as used herein is synonymous with the term lysolecithin and these terms may be used herein interchangeably.

Where one of the emulsifiers is a protein ester and/or a diglyceride and/or a monoglyceride, the second emulsifier may be for example one or more of the following: a diglyceride, a monoglyceride, such as 1-monoglyceride, lysophosphatidylcholine, or digalactosyl monoglyceride (DGMG). The second emulsifier is preferably produced from the lipid acyl donor following removal of one or more acyl groups from said lipid acyl donor.

In one embodiment the generated functional lipids of the invention can be used in a process for the preparation of a food product.

The functional lipids according to the present invention may be used with one or more other suitable food grade enzymes. Thus, it is within the scope of the present invention that, in addition to the functional lipids of the invention, at least one further enzyme is added to the food product. Such further enzymes include starch degrading enzymes such as endo- or exoamylases, pullulanases, debranching enzymes, hemicellulases including xylanases, cellulases, oxidoreductases, e.g. glucose oxidase, pyranose oxidase, sulfhydryl oxidase or a carbohydrate oxidase such as one which oxidises maltose, for example hexose oxidase (HOX), lipases, phospholipases, glucolipases and hexose oxidase, and proteases.

The lipid-containing plant material treated with lipolytic enzymes to generate functional lipids according to the present invention may be used without purification or with limited purification of the functional lipids together with one or more other suitable food grade enzymes. Thus, it is within the scope of the present invention that, in addition to the purified or un-purified functional lipids of the invention, at least one further enzyme is added to the food product. Such further enzymes include starch degrading enzymes such as endo- or exoamylases, pullulanases, debranching enzymes, hemicellulases including xylanases, cellulases, oxidoreductases, e.g. glucose oxidase, pyranose oxidase, sulfhydryl oxidase or a carbohydrate oxidase such as one which oxidises maltose, for example hexose oxidase (HOX), lipases, phospholipases, glucolipases and hexose oxidase, and proteases.

In one preferred embodiment the lipolytic enzyme has one or more of the following lipase activities: glycolipase activity (E.C. 3.1.1.26, triacylglycerol lipase activity (E.C. 3.1.1.3), phospholipase A2 activity (E.C. 3.1.1.4) or phospholipase A1 activity (E.C. 3.1.1.32). Suitably, lipase enzymes are well know within the art and include by way of example the following lipases: Grindamyl Powerbake 4070 or 4080 (Danisco A/S), Lysomax Oil (Danisco A/S), LIPOPAN® F and/or LECITASE® ULTRA (Novozymes A/S, Denmark), phospholipase A2 (e.g. phospholipase A2 from LIPOMOD™ 22 L from Biocatalysts, LIPOMAX™ from Genencor), LIPOLASE® (Novozymes A/S, Denmark), the lipases taught in WO03/97835, EP 0 977 869 or EP 1 193 314. A person skilled in the art will be able to combine proportions of lipolytic enzymes.

Traditionally the cake industry uses cake improvers for the production of cakes and to secure high quality cakes in terms of taste, structure, eating quality and appearance.

These cake improvers are normally based on emulsifiers spray dried on a carrier like starch and malto dextrin. Some cake improvers are also in a gel form based on emulsifiers, sugars and water.

These cake improvers are very important for the cake industry in order to produce cake of high quality. Cake improvers however contain emulsifiers and other "non-natural" ingredients with an E-number. Because of demand for the consumers to reduce the numbers of E-numbers, the cake industry has asked for alternative ways to produce cakes of high quality without using this kind of emulsifiers.

The lipid-containing plant material treated with lipolytic enzymes to generate functional lipids according to the present invention may be used as food improvers either without purification or with limited purification of the functional lipids or as completely purified functional lipids.

In one aspect of the invention the food improver is a cake improver.

In one aspect of the invention the food improver is a bread improver.

The food improver generated according to the present invention may suitably comprise one or more of the following additives:

soy protein material; carotenoids, flavenoids, antioxidant and phytochemical (especially anthocyanonide, carotenoid, bioflavinoid, glutathione, catechin, isoflavone, lycopene, ginsenoside, pycnogenol, alkaloid, pygeum phytosterol, sulphoraphone, resveretol, grape seed extract or food containing stanol esters), vitamin (especially vitamin C, vitamin A, vitamin B3, vitamin D, vitamin E, thiamine, riboflavin, niacin, pyridoxine, cyanocobalamin, folic acid, biotin, pantothenic acid or vitamin K), minerals (especially calcium, iodine, magnesium, zinc, iron, selenium, manganese, chromium, copper, cobalt, molybdenum or phosphorus), fatty acid (especially gamma-linoleic acid, ucospentaenoic acid or decosahexaenoic acid), oil (especially borage oil, high carotenoid canola oil or flax seed oil), glucerol, sorbitol, amino acid (especially tryptophan, lysine, methionine, phenylalanine, threonine, valine, leucine, isoleucine, alanine, arginine, aspartic acid, cystine, cysteine, glutamic acid, glutamine, glycine, histidine, proline, hydroxyproline, serine, taurine or tyrosine), enzyme as defined above (especially bromelain, papain, amylase, cellulase or coenzyme Q), lignin, stanol ester or friendly bacteria (especially *Lactobacillus acidophilus, Lactobacillus bulgaricus, Lactobacillus bifidus, Lactobacillus plantarum* or *Streptococcus faecium*), folic acid, insoluble and/or soluble fibre.

The present invention may provide one or more of the following unexpected technical effects in egg products, particularly mayonnaise: improved heat stability during pasteurisation;

improved organoleptic properties, an improved consistency.

The present invention may provide one or more of the following unexpected technical effects in dough and/or baked products: an improved specific volume of either the dough or the baked products (for example of bread and/or of cake); an improved dough stability; an improved crust score (for example a thinner and/or crispier bread crust), an improved crumb score (for example a more homogenous crumb distribution and/or a finer crumb structure and/or a softer crumb); an improved appearance (for example a smooth surface without blisters or holes or substantially without blisters or holes); a reduced staling; an enhanced softness; an improved odour; an improved taste.

The present invention may provide a beneficial effect from the functional lipids as these functions as highly surface-active materials in a food product without formation of substantial amount of free fatty acids, which reduce the ability of the food product to oxidize upon storage, because free fatty acids are more prone to oxidation than the corresponding fatty acid esters.

In a further aspect the present invention provides the use of a lipolytic enzyme to generate other functional compounds according to the present invention in a lipid-containing plant material.

It is to be understood that the action of the lipid modifying enzymes, such as lipolytic enzymes on the lipid-containing plant material may not only generate functional lipids, but also other functional compounds, such as with the action of a lipid transferase, wherein an acyl group from a lipid is transferred to one or more other acceptor substrates, such as one or more of the following: a sterol; a stanol; a carbohydrate; a protein; a protein subunit; and glycerol.

In some particular embodiments the functional compounds generated in the methods according to the present invention are functional esters.

In some embodiments, both functional lipids and other functional compounds are generated by the methods according to the present invention.

These functional compounds generated by the methods according to the present invention may then be used in the manufacture of a dough and/or a baked product, comprising adding said functional compounds to a dough, and (optionally) baking the dough to make a baked product for one or more of the following: reducing stickiness of the dough; improving machinability of the dough; reducing blistering during baking of the baked product; improving bread volume and/or softness; prolonging shelf life of the baked product and/or dough; improving antistaling effect of the baked product and/or dough; improving crumb structure of the baked product; reducing pore heterogeneity of the baked product; improving pore homogeneity of the baked product; reducing mean pore size of the baked product; enhancing the gluten index of the dough; improving flavour and/or odour of the baked product, improving the color of the crust of the baked product.

In one aspect the functional compounds generated by the methods according to the present invention are purified or partly purified.

In one aspect the functional compounds generated by the methods according to the present invention are not further purified before use in a food product.

In one aspect the functional compounds generated by the methods according to the present invention are formulated into a dry product.

In one aspect the functional compounds are concentrated or diluted before use in a food product.

In another aspect of the invention, there is provided a method of making noodles, or a noodle dough or a noodle-based product, which method comprises adding a functional compound according to the present invention to the noodle, noodle dough or noodle-based product.

In one aspect of the present invention, there is provided a use of a functional compound according to the present invention in the manufacture of a noodle or a noodle-based product for one or more of improving color/yellowness, stabilising color characteristics, reducing brightness, reducing fat content, improving texture and bite (chewiness), reducing water activity, reducing breakage, increasing core firmness and improving shape retention during processing.

In another aspect of the invention, there is provided a method of making a tortilla or tortilla dough, which method comprises adding a food improver generated according to the present invention to the tortilla or tortilla dough.

In another aspect of the invention, there is provided a method of making pasta or whole grain pasta or a pasta dough, which method comprises adding a food improver generated according to the present invention to the pasta or pasta dough.

A further aspect of the present invention provides the use of a food improver generated according to the present invention in the manufacture of a tortilla or a tortilla dough for improving the rollability of a tortilla, increasing pliability of a tortilla, improving antistaling properties of the tortilla and/or tortilla dough, improving softness and/or reducing off-flavour in the tortilla and/or tortilla dough.

The functionality of the food improver may be improved by combination with emulsifiers such as DATEM.

Suitably, the present invention may provide one or more of the following unexpected technical effects in a food product: an improved appearance, an improved mouthfeel, an improved stability, in particular an improved thermal stability, an improved taste, an improved softness, an improved resilience, an improved emulsification.

Suitably, the present invention may provide one or more of the following unexpected technical effects in dairy products, such as ice cream for example: an improved mouthfeel (preferably a more creamy mouthfeel); an improved taste; an improved meltdown.

Suitably, the present invention may provide one or more of the following unexpected technical effects in egg or in egg products: improved stability of emulsion; thermal stability of emulsion; improved flavour; reduced mal-odour; improved thickening properties, improved consistency.

Specific technical effects associated with the use of the food improver as defined herein in the preparation of a food product are listed in the table below:

| Food product | Effect |
|---|---|
| 1 Bread, Muffins and Doughnuts | Strengthens dough and increases water absorption capacity. Increases volume of bakery products and maintains softness of crumb |
| 2 Frozen dough | Prevents spoiling during refrigeration |
| 3 Sponge cake | Makes good cake volume and a uniform soft texture |
| 4 Biscuit, cracker and cookie | Makes stable emulsions of fat and prevents stickiness to the machine. Prevents blooming of high fat products |
| 5 Batter and breading | Improves texture of fried products. |
| 6 Noodles | Prevents dough from sticking to the machine. Increases water content, and decreases cooking loss |
| 7 Instant noodles | Prevent noodles form adhering to each other |
| 8 Pasta | Dough conditioner prevents adhesion on cooking. |
| 9 Custard cream | Makes starch paste with a smooth and creamy texture, and prevents dehydration. |
| 10 Coffee whitener | Prevent oil and water separation |
| 11 Whipping cream | Provides stable emulsion |
| 12 Chocolate | Prevents or reduced blooming |
| 13 Caramel, candy and nougat | Improves emulsification of molten sugar and oil. Prevents separation of oil. |
| 14 Processed meat, sausages | Improves water holding capacity of sausages and pressed ham, and prevents separation of oil phase of pastes and pâté. |

In a further aspect of the present invention provides the use of a lipolytic enzyme in a process of preparing functional lipids.

In another aspect of the present invention there is provided a process of preparing a lyso-phospholipid, for example lysolecithin, which process comprises treating a lipid-containing plant material with the lipolytic enzyme according to the present invention.

In a further aspect of the present invention provides the use of a lipolytic enzyme in a process of preparing a lyso-glycolipid, (for example digalactosyl monoglyceride (DGMG) or monogalactosyl monoglyceride (MGMG)) by treatment of a lipid-containing plant material with the lipolytic enzyme according to the present invention.

Determination of Galactolipase Activity (Glycolipase Activity Assay):

Substrate:

0.6% digalactosyldiglyceride (Sigma D 4651), 0.4% Triton-X 100 (Sigma X-100) and 5 mM CaCl2 was dissolved in 0.05M HEPES buffer pH 7.

Assay Procedure:

400 µL substrate was added to an 1.5 mL Eppendorf tube and placed in an Eppendorf Thermomixer at 37° C. for 5 minutes. At time t=0 min, 50 µL enzyme solution was added. Also a blank with water instead of enzyme was analyzed. The sample was mixed at 10*100 rpm in an Eppendorf Thermomixer at 37° C. for 10 minutes. At time t=10 min the Eppendorf tube was placed in another thermomixer at 99° C. for 10 minutes to stop the reaction. Free fatty acid in the samples was analyzed by using the NEFA C kit from WAKO GmbH.

Enzyme activity, GLU, at pH 7 was calculated as micromoles of fatty acid produced per minute under assay conditions.

Determination of Phospholipase Activity (Phospholipase Activity Assay):

Phospholipase activity was measured using two different methods which give comparable results. Either of these methods can be used to determine phospholipase activity in accordance with the present invention.

"PLU Assay" for Determination of Phospholipase Activity

Substrate:

0.6% L-α Phosphatidylcholine 95% Plant (Avanti #441601), 0.4% Triton-X 100 (Sigma X-100) and 5 mM $CaCl_2$ was dissolved in 0.05M HEPES buffer pH 7.

Assay Procedure:

400 µL substrate was added to an 1.5 mL Eppendorf tube and placed in an Eppendorf Thermomixer at 37° C. for 5 minutes. At time t=0 min, 50 µL enzyme solution was added. Also a blank with water instead of enzyme was analyzed. The sample was mixed at 10*100 rpm in an Eppendorf Thermomixer at 37° C. for 10 minutes. At time t=10 min the Eppendorf tube was placed in another thermomixer at 99° C. for 10 minutes to stop the reaction. Free fatty acid in the samples was analyzed by using the NEFA C kit from WAKO GmbH.

Enzyme activity PLU-7 at pH 7 was calculated as micromoles of fatty acid produced per minute under assay conditions "TIPU assay" for determination of phospholipase activity 1 TIPU (Titration Phospholipase Unit) is defined as the amount of enzyme, which liberates 1 µmol free fatty acid per minute at the assay conditions.

Phospholipase A1 and A2 catalyse the conversion of lecithin to lyso-lecithin with release of the free fatty acid from position 1 and 2, respectively. Phospholipase activity can be determined by continous titration of the fatty acids liberated from lecithin during enzymation, since the consumption of alkali equals the amount of fatty acid liberated.

Substrate:

4% lecithin, 4% Triton-X 100, and 6 mM CaCl2: 12 g lecithin powder (Avanti Polar Lipids #44160) and 12 g Triton-X 100 (Merck 108643) was dispersed in approx. 200 ml demineralised water during magnetic stirring. 3.0 ml 0.6 M CaCl2 (p.a. Merck 1.02382) was added. The volume was adjusted to 300 mL with demineralised water and the emulsion was homogenised using an Ultra Thurax. The substrate was prepared freshly every day.

Assay Procedure:

An enzyme solution was prepared to give a slope on the titration curve between 0.06 and 0.18 ml/min with an addition of 300 μL enzyme.

A control sample of known activity is included.

The samples were dissolved in demineralised water and stirred for 15 min. at 300 rpm. 25.00 ml substrate was thermostatted to 37.0° C. for 10-15 minutes before pH was adjusted to 7.0 with 0.05 M NaOH. 300 μL enzyme solution was added to the substrate and the continuous titration with 0.05 M NaOH was carried out using a pH-Stat titrator (Phm 290, Mettler Toledo). Two activity determinations are made on each scaling.

After 8 minutes the titration is stopped and the slope of the titration curve is calculated between 5 and 7 minutes. The detection limit is 3 TIPU/ml enzyme solution.

Calculations:

The phospholipase activity (TIPU/g enzyme) was calculated in the following way:

$$TIPU/g = \frac{\alpha \cdot N \cdot 10^6 \frac{\mu mol}{mol} \cdot 10^{-3} \frac{l}{ml} \cdot V_1}{m \cdot V_2} = \frac{\alpha \cdot N \cdot 10^3 \cdot V_1}{m \cdot V_2}$$

Where:

α is the slope of the titration curve between 5 and 7 minutes of reaction time (ml/min).

N is the normality of the NaOH used (mol/l).

V1 is the volume in which the enzyme is dissolved (ml).

m is the amount of enzyme added to V1 (g).

V2 is the volume of enzyme solution added to the substrate (ml).

Determination of Triacylglyceride Lipase Activity: Assay Based on Triglyceride (Tributyrin) as Substrate (LIPU):

Lipase activity based on tributyrin is measured according to Food Chemical Codex, Forth Edition, National Academy Press, 1996, p 803, ith the modifications that the sample is dissolved in deionized water instead of glycine buffer, and the pH stat set point is 5.5 instead of 7.

1 LIPU is defined as the quantity of enzyme which can liberate 1 mol butyric acid per minute under assay conditions.

In one aspect of the invention, the lipolytic enzyme used according to the present invention may be obtainable from a filamentous fungus. More preferably, the fungal lipolytic enzyme is obtainable (preferably obtained) from *Fusarium* spp. Preferably, the fungal lipolytic enzyme used according to the present invention may be obtainable (preferably obtained) from *Fusarium heterosporum* or *Fusarium semitectum*. Suitably, the fungal lipolytic enzyme used according to the present invention may be obtainable (preferably obtained) from *Fusarium heterosporum* (CBS 782.83) or *Fusarium semitectum* (IBT 9507).

Thus in one aspect, preferably the lipolytic enzyme used according to the present invention is a filamentous fungal lipolytic enzyme, preferably a filamentous fungal wild-type lipolytic enzyme.

In some of the applications mentioned herein, particularly the food applications, such as the bakery applications, the food improver generated according to the present invention may be used with one or more conventional emulsifiers, including for example monoglycerides, diacetyl tartaric acid esters of mono- and diglycerides of fatty acids, sodium stearoyl lactylate (SSL) and lecithins.

The food improver generated by the methods according to the present invention is especially preferred in bread recipes with added fat.

In addition or alternatively, the food improver generated by the methods according to the present invention may be used with one or more other suitable food grade enzymes. Thus, it is within the scope of the present invention that, in addition to the lipolytic enzyme of the present invention, at least one further enzyme may be added to the baked product and/or the dough. Such further enzymes include starch degrading enzymes such as endo- or exoamylases, pullulanases, debranching enzymes, hemicellulases including xylanases, cellulases, oxidoreductases, e.g. glucose oxidase, pyranose oxidase, sulfhydryl oxidase or a carbohydrate oxidase such as one which oxidises maltose, for example hexose oxidase (HOX), lipases, phospholipases, galatolipases and hexose oxidase, proteases, and acyltransferases (such as those described in WO04/064987 for instance).

It is particularly preferred that the lipolytic enzyme used according to the present invention is used in combination with alpha amylases in producing food products. In particular, the amylase may be a non-maltogenic amylase, such as a polypeptide having non-maltogenic exoamylase activity, in particular, glucan 1,4-alpha-maltotetrahydrolase (EC 3.2.1.60) activity (as disclosed in WO05/003339). A suitable non-maltogenic amylase is commercially available as Powersoft™ (available from Danisco A/S, Denmark). Maltogenic amylases such as Novamyl™ (Novozymes A/S, Denmark) may also be used. In one embodiment, the combined use of alpha amylases and the food improver of the invention may be used in a dough, and/or the production of a baked product, such as bread, cakes, doughnuts, cake doughnuts or bagels. The combination of alpha amylases and the food improver of the invention is also considered as preferable for use in methods of production of tortillas, such as wheat and/or maize tortillas.

In another preferred embodiment, the food improver generated according to the present invention may be used in combination with a xylanase in producing food products. GRINDAMYL™ and POWERBake 7000 are examples of commercially available xylanase enzymes available from Danisco A/S. Other examples of xylanase enzymes may be found in WO03/020923 and WO01/42433.

Preferably, the food improver generated according to the present invention may be used in combination with a xylanase and an alpha amylase. Suitably the alpha amylase may be a maltogenic, or a non-maltogenic alpha amylase (such as GRINDAMYL™ or POWERSoft, commercially available from Danisco A/S), or a combination thereof.

The food improver of the invention can also preferably be used in combination with an oxidising enzyme, such as a maltose oxidising enzyme (MOX), for example hexose oxidase (HOX). Suitable methods are described in WO03/099016. Commercially available maltose oxidising enzymes GRINDAMYL™ and SUREBake are available from Danisco A/S.

Optionally an alpha-amylase, such as a non-maltogenic exoamylase and/or a maltogenic amylases, and/or a maltose oxidising enzyme (MOX) in combination with the enzyme may be used in methods according to the present invention for preparing a dough, a baked product, tortilla, cake, pasta, instant noodle/fried snack food, or a dairy product such as cheese.

The food improver generated according to the present invention is typically included in the food product or other composition by methods known in the art. Such methods include adding the food improver directly to the food product or composition, addition of the food improver in combination with a stabilizer and/or carrier, and addition of a mixture comprising the food improver and a stabilizer and/or carrier.

Suitable stabilizers for use with the present invention include but is not limited to inorganic salts (such as NaCl, ammonium sulphate), sorbitol, emulsifiers and detergents (such as Tween 20, Tween 80, Panodan AB100 without triglycerides, polyglycerolester, sorbitanmonoleate), oil (such as rape seed oil, sunflower seed oil and soy oil), pectin, trehalose, sorbitol and glycerol.

Suitable carriers for use with the present invention include but are not limited to starch, cereal flours, ground wheat, wheat flour, NaCl and citrate.

For baked products, such as bread, steam buns and US white pan bread, for example, the addition of a food improver of the present invention may result in one or more of the following: improved bread volume and softness, prolonged shelf life and/or an antistaling effect, improved crumb structure, reduced pore heterogeneity, reduced mean pore size, enhanced gluten index, improved flavour and/or odour, and improved color of the crust.

Advantageously, the food improver generated according to the present invention may be used to replace emulsifiers in food products, such as dough and/or baked products.

The food improver generated according to the present invention may have synergy with emulsifiers such as DATEM, SSL, CSL, monoglyceride, polysorbates and Tween. Thus, the food improver generated according to the present invention may be used in combination with one or more emulsifiers. Advantageously, the use of the food improver generated according to the present invention in combination with one or more emulsifiers may reduce the overall amount of emulsifier used compared with the amount needed when no food improver generated according to the present invention is used.

The food improver generated according to the present invention may also have synergy with hydrocolloids, Guar, xanthum and pectin, and with maltose oxidising enzymes such as hexose oxidase.

For doughnuts, cake doughnuts, bagels, snack cakes and muffins, for example, the use of a food improver of the present invention may result in a synergistic effect when used in combination with one or more of alpha-amylases, maltogenic alpha-amylase and non-maltogenic alpha-amylase.

For cakes, sponge cakes and palm cakes, for example, the use of the food improver of the present invention may result in a synergistic effect when used in combination with one or more of hydrocolloids such as Guar, and/or one or more emulsifiers such as DATEM.

For biscuits, for example, use of a food improver generated according to the present invention confers improved rollability and handling properties, particularly when cold (cold rollability).

Advantageously, in mayonnaise and other egg-based products, for example, use of a food improver generated according to the present invention may lead to improved texture, reduced mean particle size, and/or reduced mean particle distribution, improved heat stability, improved microwave performance and/or stability.

In cakes, use of the present invention advantageously leads to improved softness, volume, improved keeping properties and shelf life.

For noodles or noodle-products, e.g. instant noodles, for example, the food improver of the present invention may confer one or more of the following characteristics: improved color/yellowness, more stable color characteristics, reduced brightness, reduced fat content, improved texture and bite (chewiness), reduced water activity, reduced breakage, increased core firmness and improved shape retention during processing.

Preferably, the food improver of the present invention may be used to reduce the fat content of a noodle or a noodle product, for instance an instant noodle.

In tortilla, for example, use of the food improver generated according to the present invention may result in one or more of the following: reduced rollability of the tortilla, for instance by increasing pliability, improved antistaling properties, improving softness and/or reducing off flavour.

Advantageously, improved rollability and/or pliability may lead to a reduced likelihood of the tortilla splitting when rolled.

The food improver generated according to the present invention is particularly useful in the preparation of baked products, such as those prepared from a dough, including breads, cakes, sweet dough products, laminated doughs, liquid batters, muffins, doughnuts, biscuits, crackers and cookies.

The food improver generated according to the present invention is particularly useful in the preparation of breakfast cereals, such as those prepared from a dough.

The food improver may also be used in bread-improving additive, e.g. dough compositions, dough additive, dough conditioners, pre-mixes and similar preparations conventionally added to the flour and/or the dough during processes for making bread or other baked products to provide improved properties to the bread or other baked products.

Thus, the present invention further relates to a bread-improving composition and/or a dough-improving composition comprising a food improver generated according to the present invention; and also to a dough or baked product comprising such a bread-improving and/or dough-improving composition.

The bread-improving composition and/or dough-improving composition may comprise, in addition to a fungal lipolytic enzyme according to the present invention, other substances, which substances are conventionally used in baking to improve the properties of dough and/or baked products.

The bread-improving composition and/or dough-improving composition may comprise one or more conventional baking agents, such as one or more of the following constituents:

A milk powder, gluten, an emulsifier, granulated fat, an amino acid, a sugar, a salt, flour or starch.

Examples of suitable emulsifiers are: monoglycerides, diacetyl tartaric acid esters of mono- and diglycerides of fatty acids, sugar esters, sodium stearoyl lactylate (SSL) and lecithins.

The bread and/or dough improving composition may further comprise another enzyme, such as one or more other suitable food grade enzymes, including starch degrading enzymes such as endo- or exoamylases, pullulanases, debranching enzymes, hemicellulases including xylanases, cellulases, oxidoreductases, e.g. glucose oxidase, pyranose oxidase, sulfhydryl oxidase or a carbohydrate oxidase such as one which oxidises maltose, for example hexose oxidase (HOX), lipases, phospholipases, galactolipases, and hexose oxidase, proteases and acyltransferases (such as those described in WO04/064987 for instance).

The term "baked product" as used herein includes a product prepared from a dough. Examples of baked products (whether of white, light or dark type) which may be advantageously produced by the present invention include one or more of the following: bread (including white, whole-meal and rye bread), typically in the form of loaves or rolls or toast, French baguette-type bread, pitta bread, tortillas, tacos, cakes, pancakes, biscuits, crisp bread, pasta, noodles and the like.

The dough in accordance with the present invention may be a leavened dough or a dough to be subjected to leavening. The dough may be leavened in various ways such as by adding sodium bicarbonate or the like, or by adding a suitable yeast culture such as a culture of *Saccharomyces cerevisiae* (baker's yeast).

The dough in accordance with the present invention may be dough for preparation of a dry cereal product, a crisp bread, a biscuit or a cracker.

In another aspect of the invention, the amount of any one particular enzyme used according to the present invention may e.g. be in the range of 0.005-100 mg of enzyme protein per kg of bran, such as 0.05-50 mg of enzyme protein or such as 0.1-20 mg per kg. In some embodiments, the total amount of enzyme used according to the invention is in the range of 0.01-1 g of enzyme protein per kg of bran, such as 0.05-100 mg of enzyme protein or such as 0.1-100 mg per kg.

SPECIFIC EMBODIMENTS OF THE INVENTION

As described above the present invention relates to a method for reducing color and/or unpleasant taste and/or malodor development in a composition comprising at least partly solubilised plant material, the method comprising one or more step of controlling the oxidation processes of the plant material.

In some embodiments the method is for reducing color development. In some embodiments the method is for reducing unpleasant taste development. In some embodiments the method is for reducing malodor development.

In some embodiments the method for reducing color and/or unpleasant taste and/or malodor development is a method, wherein the plant material is cereal bran.

In some embodiments the method for reducing color and/or unpleasant taste and/or malodor development is a method, wherein the cereal bran is selected from wheat, barley, oat, rye, triticale, rice, and corn.

In some embodiments the method for reducing color and/or unpleasant taste and/or malodor development is a method, wherein the step of controlling the oxidation processes are preformed prior to or during solubilization of the plant material. In some embodiments the method for reducing color and/or unpleasant taste and/or malodor development is a method, wherein the step of controlling the oxidation processes are preformed simultaneously with the solubilization of the plant material.

In some embodiments the method for reducing color and/or unpleasant taste and/or malodor development is a method, wherein the oxidation processes are controlled by the use of one or more enzyme.

In some embodiments the method for reducing color and/or unpleasant taste and/or malodor development comprises one or more step of controlling the oxidation processes are selected from the list consisting of:

i) treating the composition with an oxido-reductase enzyme;

ii) treating the composition with an antioxidant;

iii) treating the composition with one or more lipid acyltransferase;

iv) treating the composition under conditions to reduce the access of the composition to oxygen;

v) treating the composition under conditions to inhibit or destroy enzyme activity of endogenous oxidases; and vi) treating the composition under conditions to physically or chemically remove oxygen from the composition.

It is to be understood that the composition may be treated by any one, two, three, four, five or all of the specific steps indicated under i) to vi).

In some embodiments the method for reducing color and/or unpleasant taste and/or malodor development does not comprise the addition of exogenous antioxidant.

In some embodiments the method for reducing color and/or unpleasant taste and/or malodor development does not comprise the addition of exogenous alkali, such as one selected from sodium hydroxide (NaOH) and potassium hydroxide (KOH).

In some embodiments the method for reducing color and/or unpleasant taste and/or malodor development does not comprise the addition of exogenous ozone and/or hydrogen peroxide.

In some embodiments the method for reducing color and/or unpleasant taste and/or malodor development does not comprise the addition of exogenous acids and/or by the method of kilning, and/or by use of microwave heating.

In some embodiments the oxido-reductase enzyme used under step i) is an oxidase. In some embodiments the oxidase is an hexose oxidase.

In some embodiments the method for reducing color and/or unpleasant taste and/or malodor development is a method, wherein the lipid acyltransferase in step iii) reduces the amount of lipids and/or phenolic compounds giving rice to color and/or unpleasant taste and/or malodor development.

In some embodiments the method for reducing color and/or unpleasant taste and/or malodor development is a method, wherein the endogenous oxidases in step v) oxidize compounds giving rice to color and/or unpleasant taste and/or malodor development.

In some embodiments the method for reducing color and/or unpleasant taste and/or malodor development is a method, wherein the oxygen potential is lowered.

In some embodiments the method for reducing color and/or unpleasant taste and/or malodor development is a method, wherein the oxygen potential is lowered by at least about 20%, such as at least about 30%, such as at least about 40%, such as at least about 60%, such as at least about 80% relative to the oxygen potential in a method without the one or more step of controlling the oxidation processes.

In some embodiments the method for reducing color and/or unpleasant taste and/or malodor development is a method, wherein the oxidation of lipids is reduced.

In some embodiments the method for reducing color and/or unpleasant taste and/or malodor development is a method, wherein the generation of one or more alkyl carboxylic acid is reduced, such as one of butanoic acid, isobutanoic, pentanoic acid, isopentanoic acid, and hexanoic acid. In some embodiments, the amount of one or more is alkyl carboxylic acid is reduced by at least about 20% relative to an untreated composition, such as at least about 30%, such as at least about 40%, such as at least about 50%, such as at least about 60%, such as at least about 70%, such as at least about 80%, such as at least about 90%, such as at least about 95%, such as at least about 99%.

In some embodiments the method for reducing color and/or unpleasant taste and/or malodor development is a method, wherein the oxidation of phenolic compounds, such as polyphenolic compounds are reduced. In some embodiments, the amount oxidized phenolic compounds is reduced by at least about 20% relative to an untreated composition, such as at least about 30%, such as at least about 40%, such as at least about 50%, such as at least about 60%, such as at least about 70%, such as at least about 80%, such as at least about 90%, such as at least about 95%, such as at least about 99%.

In some embodiments the method for reducing color and/or unpleasant taste and/or malodor development is a method, wherein the generation of guaiacol is reduced. In some embodiments, the amount of guaiacol is reduced by at least about 20% relative to an untreated composition, such as at least about 30%, such as at least about 40%, such as at least about 50%, such as at least about 60%, such as at least about 70%, such as at least about 80%, such as at least about 90%, such as at least about 95%, such as at least about 99%.

In some embodiments the method for reducing color and/or unpleasant taste and/or malodor development is a method, wherein the composition is treated by application of a nitrogen blanket or nitrogen flushing.

In some embodiments the method for reducing color and/or unpleasant taste and/or malodor development is a method, wherein the antioxidant is selected from the group consisting of ascorbic acid, fatty acid esters of ascorbic acid, N-acetylcysteine, benzyl isothiocyanate, beta-carotene, chlorogenic acid, citric acid, 2,6-di-tert-butylphenol, lactic acid, tartaric acid, uric acid, sodium ascorbate, calcium ascorbate, sodium phosphates (such as monosodium phosphate, disodium phosphate, trisodium phosphate), potassium phosphates (such as monopotassium phosphate, dipotassium phosphate, tripotassium phosphate), lecithin, potassium ascorbate, rosemary extract, green tea extract, black tea extract, tocopherols such as tocopherols (vitamin E), such as mixed tocopherols, α-tocopherol (any stereoisomer or any mix thereof), β-tocopherol, γ-tocopherol, δ-tocopherol, vitamin K, butylated hydroxytoluene (BHT), butylated hydroxyanisol (BHA), erythorbin acid, anoxomer antioxidants, erythorbic acid, sodium erythorbate, sodium erythorbin, ethoxyquin, glyceryl mono-oleate, catalase, gum guaiac, malic acid, propyl gallate, octyl gallate, dodecyl gallate, ethyl gallate, tertiary butylhydroquinone (TBHQ), ascorbyl stearate, ascorbyl palmitate, glutathione, citric acid esters of mono- and diglycerides of fatty acids, thiodipropionic acid, or tannic acid or combinations thereof. In a preferred embodiment the antioxidant is ascorbic acid, a phenolic compound and/or a vitamin.

In some embodiments the method for reducing color and/or unpleasant taste and/or malodor development is a method, wherein the antioxidant is an enzyme such as one selected from the list consisting of a catalase, a superoxide dismutase and a peroxidase.

In some embodiments the method for reducing color and/or unpleasant taste and/or malodor development is a method, wherein the oxido-reductase is selected from the list consisting of oxidases selected from the group of E.C. 1.1.3.x, such as an oxidase selected from a glucose oxidase (EC 1.1.3.4), a pyranose oxidase, a hexose oxidase (EC 1.1.3.5), glycerol oxidase, pyranose oxidase (EC 1.1.3.10), a galactose oxidase (EC 1.1.3.9) and/or a carbohydrate oxidase which has a higher activity on maltose than on glucose.

In some embodiments the method for reducing color and/or unpleasant taste and/or malodor development is a method, wherein the oxido-reductase is a glucose oxidase.

In some embodiments the method for reducing color and/or unpleasant taste and/or malodor development modifies the sensoric properties, such as the odor characteristics of the composition.

In some embodiments the method for reducing color and/or unpleasant taste and/or malodor development is a method, which visibly reduces the color intensity of the composition.

In some embodiments the method for reducing color and/or unpleasant taste and/or malodor development is performed on an industrial scale, such as with compositions of more than 10 liters, such as more than 20 liters, such as more than 50 liters, such as more than 100 liters, such as more than 200 liters, such as more than 400 liters, such as more than 600 liters, such as more than 1000 liters.

In some embodiments the method for reducing color and/or unpleasant taste and/or malodor development comprises a step of heat inactivation of endogenous enzyme activity such as by boiling or pasteurization of the composition.

In some embodiments the method for reducing color and/or unpleasant taste and/or malodor development is a method, wherein the composition is treated with one or more lipid acyltransferase.

In some embodiments the method for reducing color and/or unpleasant taste and/or malodor development is a method, wherein the composition is treated with one or more acyltransferase.

In some embodiments the method for reducing color and/or unpleasant taste and/or malodor development is a method, wherein the composition is treated with one or more further enzyme as defined herein.

It is to be understood that such further enzyme may be any enzyme that able to generate in situ in the composition a substrate for an oxidase enzyme. Such further enzyme may be any suitable starch modifying enzyme as defined herein, such as an amylase, or any cell-wall modifying enzyme as defined herein.

In addition to or alternatively such substrate for an oxidase enzyme may be added to the composition. Accordingly in some embodiments, any suitable substrate for an oxidase may be added to the composition. In some embodiments the substrate added is a carbohydrate, such as a hexose, such as glucose, or a disaccharide, such as maltose.

As alternative aspects the present invention relates to a method of solubilization of a composition comprising plant material, the method comprising a step of controlling the oxidation processes of the plant material.

In some embodiments the method of solubilization is a method, wherein the oxidation processes are controlled according to a method for reducing color and/or unpleasant taste and/or malodor development according to the present invention.

In some embodiments the method of solubilization is a method, wherein the composition is an at least partly solubilised lipid-containing plant material.

In some embodiments the method of solubilization is a method, wherein the composition is solubilised by sonication, such as ultrasonic treatment and/or extrusion.

In some embodiments the method of solubilization further comprises a step of treating the composition with one or more cell-wall modifying enzyme.

In some embodiments the method of solubilization further comprises a step of treating the composition with one or more starch modifying enzyme.

In some embodiments the method of solubilization is a method, wherein the composition contains in-soluble plant material.

In some embodiments the method of solubilization is a method, wherein the composition is further treated with one or more further enzyme.

In some embodiments the method of solubilization is a method, wherein the one further enzyme is one or more transglucosylation enzyme.

In some embodiments the method of solubilization is a method, wherein the one further enzyme is a protease.

In some embodiments the method of solubilization is a method, wherein the composition is treated with one or more lipid modifying enzyme is selected from the group consisting of: a triacylglycerol lipase, a phospholipase, and a galacto-lipase.

In some embodiments the method of solubilization is a method, wherein the one or more lipid modifying enzyme contain two or three activities selected from the group consisting of: triacylglycerol lipase activity, phospholipase activity, and galacto-lipase activity.

In some embodiments the method of solubilization is a method, wherein the one or more lipid modifying enzyme is one, two, three, four or five different lipid modifying enzymes.

In some embodiments the method of solubilization further comprises a step of isolating the soluble fraction after solubilization of the ceral bran.

In some embodiments the method of solubilization is a method, wherein the one or more cell-wall modifying enzyme is selected from the group consisting of a xylanase, and a cellulase, such as cellobiohydrolases, endo-glucanases, xyloglucanases, and beta-glucanase.

In some embodiments the method of solubilization is a method, wherein the cellulase is selected from an endo-cellulase, an exo-cellulase, a cellobiase, an oxidative cellulases, a cellulose phosphorylases.

In some embodiments the method of solubilization is a method, wherein the one or more one or more starch modifying enzyme selected from the group consisting of an alpha-amylase, a pullulanase, isoamylase and a beta-amylase.

In some embodiments the method of solubilization is a method, wherein the one or more transglucosylation enzyme is selected from the group consisting of enzymes of enzyme class EC3.2.1.20.

In some embodiments the method of solubilization is a method, wherein the plant material is provided in particles, wherein the average particle size of the particulate plant material is below 3000 µm, such as below 1000 µm, such as below 500 µm.

In some embodiments the method of solubilization is a method, wherein the plant material is cereal bran.

In some embodiments the method of solubilization is a method, wherein the cereal bran is selected from wheat, barley, oat, rye, triticale, rice, and corn.

In some embodiments the method of solubilization further comprises a preceding step of i) fractionating the cereal grain to obtain endosperm, bran, and germ; ii) separating and distributing the endosperm, bran, and germ to allow them to be treated; and iii) milling the bran.

In some embodiments the method of solubilization is a method, wherein the cereal bran is obtained from an industrial milling process and further milled to obtain an average particle size below 500 µm, such as below 400 µm, such as below 200 µm.

In some embodiments the method for reducing color and/or unpleasant taste and/or malodor development is a method, wherein the plant material is a cereal bran sidestream from processing of cereal bran, such as soap stocks from refining of vegetable oils, brewers spent grain or Destillers dried spent grain with solubles (DDGS).

In some embodiments the method of solubilization is a method, wherein the plant material is a cereal bran sidestream from processing of cereal bran, such as soap stocks from refining of vegetable oils, brewers spent grain or Destillers dried spent grain with solubles (DDGS).

In some embodiments the method of solubilization is a method, wherein the solubilised plant material is further treated to inactivate further enzyme activity.

In some embodiments the method of solubilization is a method, wherein the solubilization degree of the plant material as determined on drymatter versus drymatter plant material obtained is higher than 15%, such as higher than 25%, such as higher than 35%, such as higher than 40%, such as higher than 50%, such as in the range of 40%-60%, such as in the range of 50%-60%.

Bran Solubilization Method 2:

Wheat bran may be suspended in 50 mM NaPi, pH 5 (13% w/w) in a container/reactor with closed lid. The Bran suspension is optionally heated to 100 dg C. under stirring, and boiled for 2 min. Sample is placed under stirring at 150 rpm at 50 dg C. and left to equilibrate in regard to temp. Enzymes are added and reaction is continued @ 50 dg C. At indicated time point the sample is transferred to test tube and centrifuged (5 min, 1500 rpm, at ambient temp). The obtained supernatant is lyophilised and the resulting solids are weighted. Calculating the amount of dry matter obtained from lyophilisation of the solubles relative to the amount of bran suspended, it is possible to obtain a degree of solubilisation. A correction may be made according to the amount of buffer in which the bran was suspended versus the amount of solubles obtained from centrifugation, since it may be assumed that the concentration of solubles are the same in the entire soluble fase.

In some embodiments the method of solubilization is a method, wherein the total content of lipids and modified lipids, such as functional lipid as determined on drymatter versus drymatter cereal bran in the soluble fraction obtained is at least about 0.05%, such as at least about 1.0%, such as in the range of 0.05-5%.

In some embodiments the method of solubilization further comprises a step of drying the solubilised composition obtained.

In some embodiments the method of solubilization further comprises a step of spray drying the solubilised composition obtained.

In some embodiments the method of solubilization further comprises a step of lyophilisation of the solubilised composition obtained.

In some embodiments the method of solubilization is a method, wherein the treatment with one or more lipid modifying enzymes generates functional lipids, such as emulsifiers or lipids having improved health benefits.

In some embodiments the method of solubilization is a method, wherein the treatment with one or more lipid modifying enzymes generates other functional compounds, such as functional sterol esters.

In some embodiments the method of solubilization is a method, wherein the treatment with one or more lipid modifying enzymes is converting more than 5%, such as more than 10%, such as more than 25%, such as more than 50% phosphotidylinositol into lysophosphatidylinositol (lyso-PI).

In some embodiments the method of solubilization comprising the steps of:

a) Preparing a liquid suspension of particulate cereal bran containing substantial amounts of starch;

b) Treating the particulate cereal bran containing substantial amounts of starch in liquid suspension sequentially in any order without the removal of any components or simultaneously with: one or more cell-wall modifying enzyme; one or more starch modifying enzyme; and optionally one or more further enzyme.

In some embodiments the method of solubilization is a method, wherein the particulate cereal bran is treated simultaneously with a combination of enzymes comprising: one or more cell-wall modifying enzyme; and one or more starch modifying enzyme; and optionally one or more further enzyme.

In some embodiments the method of solubilization further comprises the step of harvesting the soluble fraction obtained from step b).

In some embodiments the method of solubilization is a method, wherein the content of arabinoxylan oligosaccharides (AXOS) as determined on drymatter versus drymatter cereal bran in the soluble fraction obtained from step b) is above 2%, such as above 5%, such as above 10%, such as above 12.5%.

In some embodiments the method of solubilization is a method, wherein more than 10% of arabinoxylan (AX) in the cereal bran, such as more than 20% of AX in the cereal bran, such as more than 30% of AX in the cereal bran, such as more than 40% of AX in the cereal bran, such as more than 50% of AX in the cereal bran is converted to arabinoxylan oligosaccharides (AXOS) in the soluble fraction obtained from step b).

In some embodiments the method of solubilization is a method, wherein more than 2% of the starch in the cereal bran, such as more than 5% of the starch in the cereal bran, such as more than 10% of the starch in the cereal bran, such as more than 15-50% of the starch in the cereal bran is converted to isomaltooligosaccharide (IMO) in the soluble fraction obtained from step b).

In some embodiments the method of solubilization is a method, wherein the content of modified lipid as determined on drymatter versus drymatter bran in the soluble fraction obtained from step b) is at least about 0.05%, such as at least about 1.0%, such as in the range of 0.05-5%.

In some embodiments the method of solubilization is a method, wherein more than 2% of the lipid in the cereal bran, such as more than 5% of the lipid in the cereal bran, such as more than 10% of the lipid in the cereal bran, such as more than 15-50% of the lipid in the cereal bran is modified and obtained in the soluble fraction obtained from step b).

In some embodiments the method of solubilization further comprising a step prior to step a) of i) fractionating the cereal grain to obtain endosperm, bran, and germ; ii) separating and distributing the endosperm, bran, and germ to allow them to be treated; and iii) milling the bran.

In some embodiments the solubilised cereal bran obtained in the method according to the invention is added directly as a mixture of soluble and insoluble cereal bran material in the production of the food product.

In some embodiments the food product is selected from the group consisting of bread, a breakfast cereal, a pasta, biscuits, cookies, snacks, and beer.

EXAMPLE 1

Prevention of Extract Darkening During Solubilization of Bran

Bran:

Wheat bran fractions obtained from a commercial mill was used. The fractions consisted of a fine bran fraction and a course bran fraction. Before use, the course bran fraction was milled to obtain a smaller particle size, which will increase the specific surface of the bran, eventually increase the efficiency of the enzymatic solubilization of the bran. The milling was conducted on a Retch mill to obtain an average particle size of 500 μm. However, it should be noted that a smaller particle size might be preferable, regarding the degree of solubilization.

The enzymes applied are listed in Table 1 and the experiment was carried out according to the protocol found in Table 2. Table 3 lists the different samples and the amounts of material used.

Enzymes:

TABLE 1

Enzymes used for wheat bran solubilization

| Enzyme Activity | Enzyme ID |
| --- | --- |
| Xylanase | Danisco Bacterial xylanase, BS3 1223449, lot 4010866762 |
| Cellulase/glucanase | Genencor GC220 JWS #050808 |
| Amylase | Genencor, Spezyme Fred (4016101001) |
| Glucose oxidase | Genencor GC 199, lot 4900849142 |
| Catalase | Genencor fermcolase 1000, lot 301-03326-205 |

Protocol:

Table 2. Protocol Used for Bran Solubilization.

Wheat bran is suspended in 50 mM NaPi, pH 5 (13% w/w) in a container/reactor with closed lid The Bran suspension is optionally heated to 100 dg C. under stirring, and boiled for 2 min Sample is placed under stirring at 150 rpm at 50 dg C. and left to equilibrate in regard to temp Enzymes are added and reaction is continued @ 50 dg C.

At indicated time points samples were transferred to glass tubes and centrifuged for 5 min at 1000 rpm. Pictures were taken The protocol includes an optional preboiling of the bran suspension to inactivate endogenous enzymes before addition of the exogenous enzymes.

TABLE 3

Materials used. The amounts in gram used in the different trials are specified.

gram enzyme or antioxidant sample/30 g bran

| Trial | Bran | Buffer | Xylanase | GC220 | Amylase | ascorbic acid | GC 199 | Catalase |
|---|---|---|---|---|---|---|---|---|
| 1 | 30 | 200 | 0 | 0 | 0 | 0 | 0 | 0 |
| 2 | 30 | 200 | 0.57 | 0.15 | 0.12 | 0 | 0 | 0 |
| 3 | 30 | 200 | 0.57 | 0.15 | 0.12 | 0.15 | 0 | 0 |
| 4 | 30 | 200 | 0.57 | 0.15 | 0.12 | 0 | 0.3 | 0 |
| 5 | 30 | 200 | 0.57 | 0.15 | 0.12 | 0 | 0.3 | 0.05 |

Results:

Experiments were carried out as outlined in the protocol in Table 2 either with or without the optional preboiling of the bran suspension. FIG. 1 shows the color development of the 5 different samples (Table 1) after 24 hrs with preboiling of the bran suspension before addition of enzymes. Addition of ascorbic acid, glucose oxidase and catalase (Trial 3-5) significantly reduces the darkening of the bran extract.

Another experiment was carried out as described in Table 2 where the bran suspension was not preboiled before addition of enzymes (Table 3). Here we also see a significant reduction in the color development (FIG. 2).

EXAMPLE 2

Effect of Addition of Glucose Oxidase and Catalase During Bran Solubilization on pH, Gluconic Acid Formation and Volatiles Development Bran:

Wheat bran fractions obtained from a commercial mill was used. The fractions consisted of a fine bran fraction and a course bran fraction. Before use, the course bran fraction was milled to obtain a smaller particle size, which will increase the specific surface of the bran, eventually increase the efficiency of the enzymatic solubilization of the bran. The milling was conducted on a Retch mill to obtain an average particle size of 500 μm. However, it should be noted that a smaller particle size might be preferable, regarding the degree of solubilization.

Enzymes:

TABLE 4

Enzymes used for wheat bran solubilization

| Enzyme Activity | Enzyme ID |
|---|---|
| Xylanase | Bacterial xylanase, BS3 1223449, lot 4010866762 |
| Cellulase/glucanase | Genencor GC220 JWS #050808 |
| Amylase | Genencor, Spezyme Fred (4016101001) |
| Glucose oxidase | Genencor GC 199, lot 4900849142 |
| Catalase | Genencor fermcolase 1000, lot 301-03326-205 |

Protocol:

TABLE 5

Protocol used for bran solubilization.

Wheat bran is suspended in 50 mM NaPi, pH 5 (13% w/w) in a container/reactor with closed lid
Sample is placed under stirring at 150 rpm at 50 dg C. and left to equilibrate in regard to temp
Enzymes are added and reaction is continued @ 50 dg C.
Samples are taken out after 24 hrs

TABLE 6

Materials used. The amounts in gram used in the different trials are specified.

| Trial | Bran | Buffer | Xylanase | GC220 | Amylase | ascorbic acid | GC 199 | Catalase |
|---|---|---|---|---|---|---|---|---|
| 1 | 30 | 200 | 0 | 0 | 0 | 0 | 0 | 0 |
| 2 | 30 | 200 | 0.57 | 0.15 | 0.12 | 0 | 0 | 0 |
| 3 | 30 | 200 | 0.57 | 0.15 | 0.12 | 0.15 | 0 | 0 |
| 4 | 30 | 200 | 0.57 | 0.15 | 0.12 | 0 | 0.3 | 0 |
| 5 | 30 | 200 | 0.57 | 0.15 | 0.12 | 0 | 0.3 | 0.05 |

The various trials outlined in Table 6 were prepared according to the protocol in found in Table 5.

Results:

After 24 hrs incubation at 50° C. as described in Table 5 the pH of the various samples were measured, Table 7. In trials 4 and 5 significant drops in pH are observed resulting from the glucose oxidase catalyzed formation of gluconic acid generating a lower pH.

TABLE 7 pH measurements.

| Trial | pH |
|---|---|
| 1 | 5.1 |
| 2 | 5.9 |

TABLE 7-continued pH measurements.

| Trial | pH |
|---|---|
| 3 | 5.5 |
| 4 | 5.3 |
| 5 | 4.2 |

1: Blank;
2: Cell wall and starch modifying enzymes;
3: Cell wall and starch modifying enzymes + ascorbic acid;
4: Cell wall and starch modifying enzymes + glucose oxidase;
5: Cell wall and starch modifying enzymes + glucose oxidase and catalase.

The content of gluconic acid after 24 hrs incubation was measured using High Performance Anion Exchange Chromatography, Table 8.

TABLE 8

Gluconic acid content; 2: Cell wall and starch modifying enzymes; 4: Cell wall and starch modifying enzymes + glucose oxidase; 5: Cell wall and starch modifying enzymes + glucose oxidase and catalase.

| Trial | Gluconic acid, % W/W |
|---|---|
| 2 | <0.02 |
| 4 | 0.8 |
| 5 | 0.7 |

To test the development of volatile components, samples from Trials 1, 2 and 5 were analyzed using headspace analysis (FIG. 3).

As can be seen from comparing the results in FIG. 3, controlling the oxidation by addition of an oxido-reductase have a huge impact on the formation of oxidation products.

EXAMPLE 3

Lowering the Oxygen Potential by Addition of Glucose Oxidase During Bran Solubilization During catalysis glucose oxidase utilizes oxygen resulting in a lower oxygen potential. The lower oxygen potential will reduce the oxidation of endogenous compounds and thereby reduce malodour formation.

Bran:

Wheat bran fractions obtained from a commercial mill was used. The fractions consisted of a fine bran fraction and a course bran fraction. Before use, the course bran fraction was milled to obtain a smaller particle size, which will increase the specific surface of the bran, eventually increase the efficiency of the enzymatic solubilization of the bran. The milling was conducted on a Retch mill to obtain an average particle size of 500 μm. However, it should be noted that a smaller particle size might be preferable, regarding the degree of solubilization.

Table 9 and 11 lists the enzymes and amounts which were applied according to the protocol given in Table 10. The oxygen potential relative to trial 1 was measured over time.

Enzymes:

TABLE 9

Enzymes used for wheat bran solubilization

| Enzyme Activity | Enzyme ID |
|---|---|
| Xylanase | Bacterial xylanase, BS3 1223449, lot 4010866762 |
| Cellulase/glucanase | Genencor GC220 JWS #050808 |
| Amylase | Genencor, Spezyme Fred (4016101001) |
| Glucose oxidase | Genencor GC 199, lot 4900849142 |
| Catalase | Genencor fermcolase 1000, lot 301-03326-205 |

Protocol:

TABLE 10

Protocol used for bran solubilization.

Wheat bran is suspended in 50 mM NaPi, pH 5 (13% w/w) in a container/reactor with closed lid
Sample is placed under stirring at 150 rpm at 50 dg C. and left to equilibrate in regard to temp
Enzymes are added and reaction is continued @ 50 dg C.

TABLE 11

Materials used. The amounts in gram used in the different trials are specified.

| | | | gram enzyme sample | | | | |
|---|---|---|---|---|---|---|---|
| Trial | Bran | Buffer | Xylanase | GC220 | Amylase | GC 199 | Catalase |
| 1 | 8 | 53.3 | 0.152 | 0.04 | 0.032 | 0 | 0 |
| 2 | 8 | 53.3 | 0.152 | 0.04 | 0.032 | 0.08 | 0 |
| 3 | 8 | 53.3 | 0.152 | 0.04 | 0.032 | 0.08 | 0.001 |

Results:

The oxygen potential was measured over time using an oxygen sensor (Mettler Toledo) where Trial 1 was set to 100%. As can be seen in FIG. 4 the oxygen potential in samples containing glucose oxidase drops significantly over time minimizing the oxidation of endogenous bran compounds.

A decrease in pH over time was observed for Trial 2 and 3 indicating formation of gluconic acid which results in a lower pH, Table 12.

TABLE 12 pH development over time. A drop in pH is observed in Trial 2 and 3 resulting from the formation of gluconic acid.

| | Time, min | | | | | |
|---|---|---|---|---|---|---|
| | 0 | 30 | 45 | 90 | 180 | 240 |
| Trial 1 | 6.1 | 6.1 | 6.1 | 6.1 | 6 | 6.1 |
| Trial 2 | 6.1 | 6 | 6 | 5.9 | 5.9 | 5.9 |
| Trail 3 | 6.1 | 6 | 6 | 5.9 | 5.8 | 5.8 |

The invention claimed is:

1. A method for reducing color and/or unpleasant taste and/or malodor development in a composition comprising at least partly solubilized cereal bran containing starch, the method comprising:
   i) solubilizing said cereal bran without the removal of any components with an effective amount of a cell-wall modifying enzyme and a starch modifying enzyme; and
   ii) treating said cereal bran with glucose oxidase (EC 1.1.3.4) and an antioxidant selected from the group consisting of a catalase, a superoxide dismutase and a peroxidase, thereby reducing color and/or unpleasant taste and/or malodor development in an enzyme-treated cereal bran composition when compared to a composition not having been treated with said glucose oxidase and said antioxidant.

2. The method according to claim 1, wherein the oxygen potential is reduced following said treatment step.

3. The method according to claim 1, wherein said composition is at least 10 liters.

4. The method according to claim 1, further comprising a step of heat inactivating endogenous enzyme activity.

5. An enzyme-treated cereal bran composition with reduced color and/or unpleasant taste and/or malodor produced by the method according to claim 1.

6. A process for producing a food product, comprising adding said enzyme-treated cereal bran according to claim 5 to a food product.

7. A food product, produced by the process according to claim 6.

8. The method according to claim 1, wherein said cereal bran is wheat, barley, oat, rye, triticale, rice, or corn.

9. The method of claim 4, wherein said heat inactivating comprises boiling or pasteurization of said composition.

10. A process for producing bioethanol, comprising producing bioethanol using said enzyme-treated cereal bran composition according to claim 5.

* * * * *